United States Patent
Nakatani et al.

(10) Patent No.: US 10,163,035 B2
(45) Date of Patent: Dec. 25, 2018

(54) EDGE DETECTING APPARATUS AND EDGE DETECTING METHOD

(71) Applicant: CANON KABUSHIKI KAISHA, Tokyo (JP)

(72) Inventors: Toshiki Nakatani, Kawasaki (JP); Masaharu Yamagishi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/457,217

(22) Filed: Mar. 13, 2017

(65) Prior Publication Data
US 2017/0277975 A1    Sep. 28, 2017

(30) Foreign Application Priority Data
Mar. 25, 2016    (JP) .................. 2016-062159

(51) Int. Cl.
*G06K 9/62*     (2006.01)
*G06T 7/13*     (2017.01)
*G06K 9/46*     (2006.01)
*G06K 9/52*     (2006.01)

(52) U.S. Cl.
CPC ......... *G06K 9/6215* (2013.01); *G06K 9/4609* (2013.01); *G06K 9/52* (2013.01); *G06K 9/6202* (2013.01); *G06T 7/13* (2017.01)

(58) Field of Classification Search
CPC ....... G06K 9/6215; G06K 9/4609; G06T 7/13
USPC .......................................................... 382/199
See application file for complete search history.

(56) References Cited

U.S. PATENT DOCUMENTS
7,532,774 B2    5/2009    Hori et al.

FOREIGN PATENT DOCUMENTS
JP    2006-033647 A    2/2006
WO    WO-2015132817 A1 *    9/2015    ........... G06T 7/0085

OTHER PUBLICATIONS
U.S. Appl. No. 15/362,167, filed Nov. 28, 2016. Applicant: Masaharu Yamagishi.

\* cited by examiner

*Primary Examiner* — Amandeep Saini
(74) *Attorney, Agent, or Firm* — Venable LLP

(57) ABSTRACT

An edge detecting apparatus according to the present invention includes: a first determining unit configured to determine, based on an input image, at least one of a distance between local maximum pixels which are pixels of which gradation values are local maximum values and a distance between local minimum pixels which are pixels of which gradation values are local minimum values; and a detecting unit configured to detect an edge from the input image with a detection sensitivity based on the distance determined by the first determining unit.

22 Claims, 17 Drawing Sheets

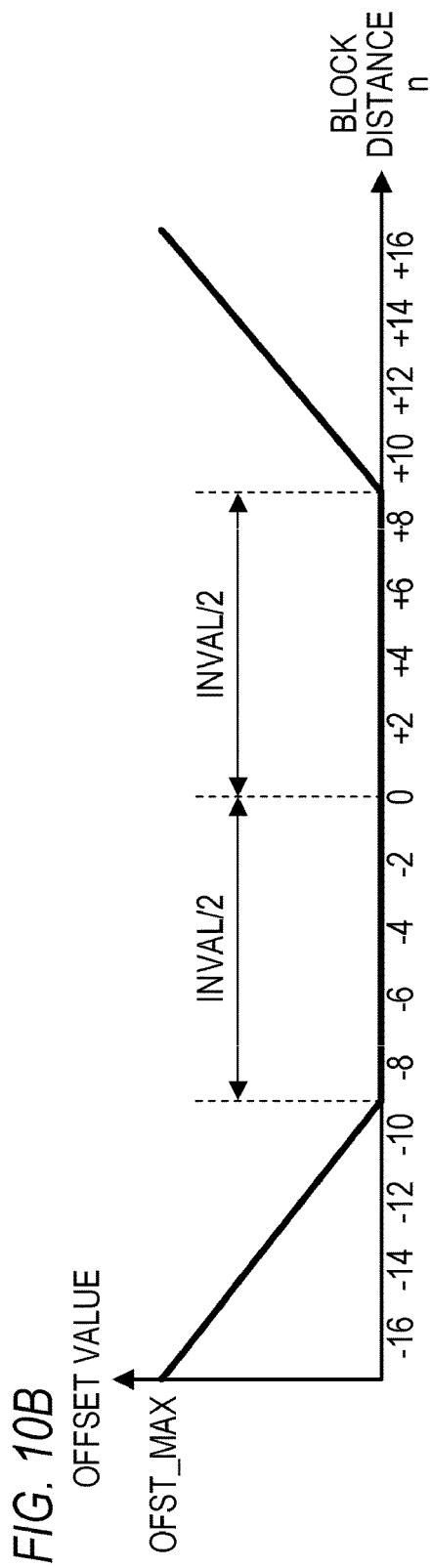

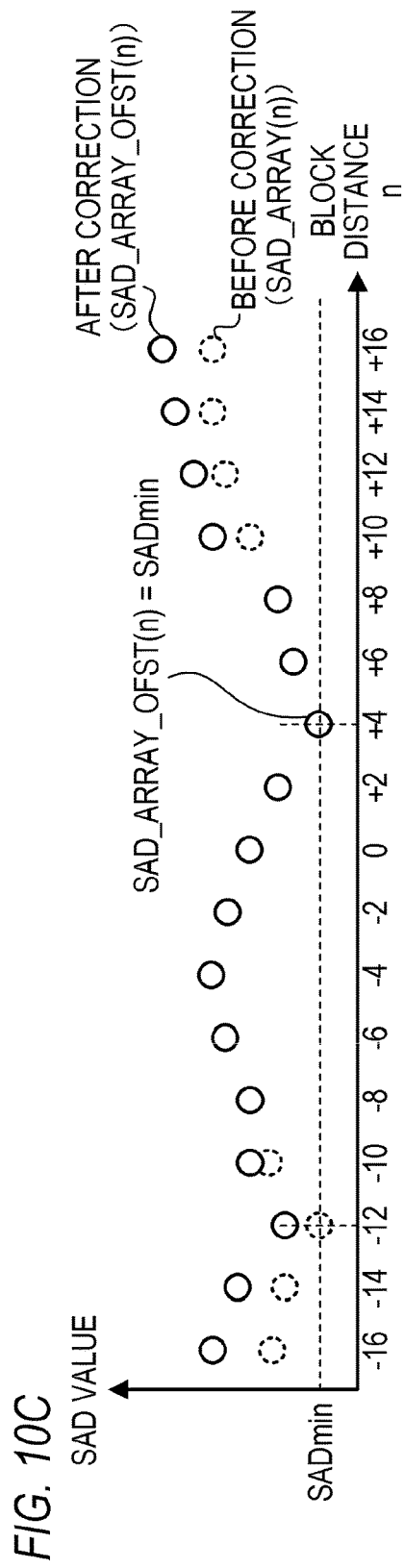

FIG. 14
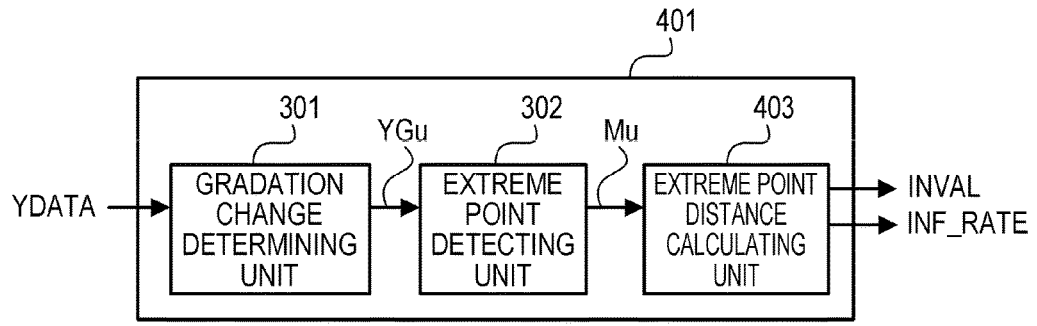
FIG. 15
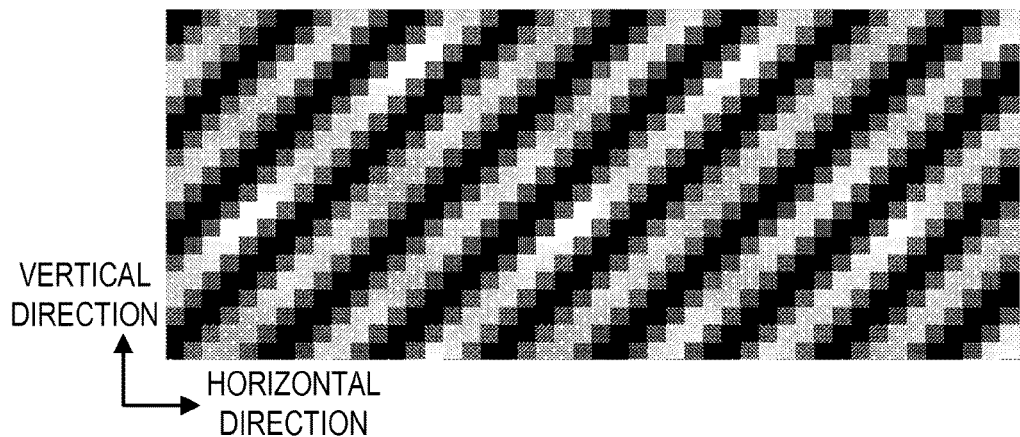
VERTICAL DIRECTION
HORIZONTAL DIRECTION
FIG. 16
| COMPLEXITY INF_RATE | THRESHOLD ATH |
|---|---|
| $0 \leq INF\_RATE \leq 0.5$ | INVAL |
| $0.5 < INF\_RATE \leq 0.75$ | INVAL×3/4 |
| $0.75 < INF\_RATE \leq 1$ | INVAL/2 |

EDGE DETECTING APPARATUS AND EDGE DETECTING METHOD

BACKGROUND OF THE INVENTION

Field of the Invention

The present invention relates to an edge detecting apparatus and an edge detecting method.

Description of the Related Art

In recent years, image display apparatuses for displaying high resolution images with higher resolutions than conventional images have become more and more widespread. High resolution images with approximately 4000 horizontal pixels (for example, images constituted by 4096 horizontal pixels×2160 vertical pixels) are generally referred to as "4k images". In addition, in a case where a resolution of input image data which is input to an image display apparatus differs from a screen resolution of the image display apparatus, the resolution of the input image data has to be converted to the same resolution as the screen resolution of the image display apparatus.

Image processing for converting the resolution of image data includes a scaler process. A scaler process refers to image processing for converting the resolution of input image data by changing (enlarging or reducing) an image size of the input image data. In a case where this image processing is performed using general methods (for example, a bicubic method), a jaggy occurs in an image region of a diagonal edge (an edge in a diagonal direction) and image quality becomes significantly degraded.

Techniques for suppressing the occurrence of a jaggy is disclosed in, for example, Japanese Patent Application Laid-open No. 2006-33647. In the technique disclosed in Japanese Patent Application Laid-open No. 2006-33647, a diagonal edge is detected from an image and, with respect to an image region of the diagonal edge, an interpolation pixel is generated using a pixel in accordance with an inclination angle of the diagonal edge (a direction of the diagonal edge). In addition, in the technique disclosed in Japanese Patent Application Laid-open No. 2006-33647, in a case where correlation values indicating a presence of an edge are respectively obtained with respect to a position close to a position of interest and a position far from the position of interest, an edge at the position of interest is detected using the correlation value corresponding to the position close to the position of interest.

However, preferentially using the correlation value corresponding to the position close to the position of interest results in a false detection of an edge. For example, a diagonal line with a shallow angle close to a horizontal line included in a natural image is a horizontal line in locally viewing. Therefore, in an image region of the diagonal line (the diagonal line with a shallow angle close to a horizontal line included in the natural image), a direction of the shallow angle and a horizontal direction are detected as candidates of a direction of the edge. Since the direction of the shallow edge corresponds to the position far from the position of interest and the horizontal direction corresponds to the position close to the position of interest, the horizontal direction is selected as the direction of the edge. In other words, the diagonal line is falsely detected as a horizontal line. As a result, the occurrence of a jaggy in the image region of the diagonal line cannot be suppressed.

A false detection of an edge also occurs in methods which do not preferentially use a correlation value corresponding to a position close to a position of interest. For example, in an image region including a periodic pattern in which a same pictorial pattern is periodically arranged in an image space, a plurality of directions may be detected as candidates of a direction of an edge. Then, even when a direction corresponding to a position close to a position of interest should be selected, a direction corresponding to a position far from the position of interest may be falsely detected (a false detection of an edge). As a result, in the image region including the periodic pattern, a false interpolation pixel is generated using a pixel in accordance with a false direction and image quality becomes significantly degraded.

SUMMARY OF THE INVENTION

The present invention provides a technique that enables an edge to be detected with higher accuracy.

The present invention in its first aspect provides an edge detecting apparatus, comprising:
 a determining unit configured to determine, based on an input image, at least one of a distance between local maximum pixels which are pixels of which gradation values are local maximum values and a distance between local minimum pixels which are pixels of which gradation values are local minimum values; and
 a detecting unit configured to detect an edge from the input image with a detection sensitivity based on the distance determined by the determining unit.

The present invention in its second aspect provides an edge detecting method, comprising:
 determining, based on an input image, at least one of a distance between local maximum pixels which are pixels of which gradation values are local maximum values and a distance between local minimum pixels which are pixels of which gradation values are local minimum values; and
 detecting an edge from the input image with a detection sensitivity based on the determined distance.

The present invention in its third aspect provides a non-transitory computer readable medium that stores a program, wherein the program causes a computer to execute:
 determining, based on an input image, at least one of a distance between local maximum pixels which are pixels of which gradation values are local maximum values and a distance between local minimum pixels which are pixels of which gradation values are local minimum values; and
 detecting an edge from the input image with a detection sensitivity based on the determined distance.

According to the present invention, an edge can be detected with higher accuracy.

Further features of the present invention will become apparent from the following description of exemplary embodiments with reference to the attached drawings.

BRIEF DESCRIPTION OF THE DRAWINGS

FIGS. 10A to 10C are diagrams showing an effect according to the first embodiment;

FIG. 14 is a block diagram showing an example of a configuration of an extreme point distance determining unit according to the second embodiment;

FIG. 15 is a diagram showing an example of a high frequency periodic pattern according to the second embodiment;

FIG. 16 is a diagram showing an example of a correspondence relationship between complexities and thresholds according to the second embodiment.

DESCRIPTION OF THE EMBODIMENTS

First Embodiment

A first embodiment of the present invention will be described below. Hereinafter, an example will be described in which an edge detecting apparatus according to the present embodiment is provided in an image processing apparatus capable of executing an scaler process for converting a resolution of image data by changing (enlarging or reducing) an image size of the image data. It should be noted that image processing to be executed by the image processing apparatus is not limited to a scaler process. For example, a blurring process, an edge enhancement process, a brightness conversion process, a color conversion process, and the like may be performed as image processing. Alternatively, the edge detecting apparatus may be a separate apparatus from the image processing apparatus.

Figure 1:
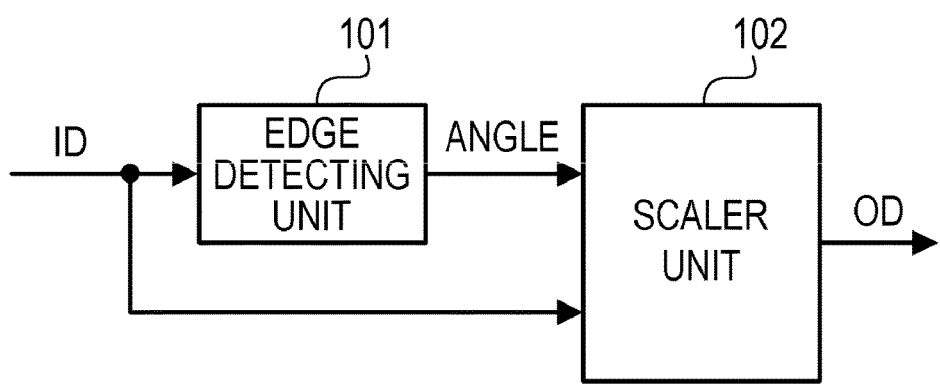
FIG. 1 is a block diagram showing an example of a configuration of an image processing apparatus according to a first embodiment.

FIG. 1 is a block diagram showing an example of a configuration of an image processing apparatus according to the first embodiment. As shown in FIG. 1, the image processing apparatus according to the present embodiment includes an edge detecting unit 101 and a scaler unit 102.

The edge detecting unit 101 detects an edge from an input image (input image data) ID. While a detecting method of an edge is not particularly limited, in the present embodiment, the edge detecting unit 101 detects any of a plurality of edges respectively corresponding to a plurality of distances from a position of interest (a target position which is a position being a target of edge detection) as an edge at the position of interest. Specifically, the edge detecting unit 101 performs block matching using the input image ID. Subsequently, based on a result of the block matching, the edge detecting unit 101 detects any of a plurality of edges respectively corresponding to a plurality of distances from the position of interest as an edge at the position of interest. The edge detecting unit 101 outputs angle information ANGLE as a result of edge detection to the scaler unit 102.

The angle information ANGLE represents the presence or absence of an edge at a position of interest set in the input image ID, a direction of an edge present at the position of interest, and the like. One or a plurality of positions of interest are set in the input image ID. In the present embodiment, the edge detecting unit 101 outputs a value of −16 to +16 as the angle information ANGLE. Specifically, as the angle information ANGLE at a position where an edge in a diagonal direction is present, the edge detecting unit 101 outputs a value representing an inclination angle of the edge relative to a vertical direction. In addition, the edge detecting unit 101 outputs 0 (zero) for both the angle information ANGLE at a position where an edge is absent and the angle information ANGLE at a position where an edge in a horizontal direction is present. It should be noted that a method of expressing a presence or absence of an edge, a method of expressing a direction of an edge, and the like are not limited to the methods described above. For example, a direction of an edge may be expressed by an inclination angle of the edge relative to a horizontal direction.

The scaler unit 102 generates an image (image data) OD by per forming a scaler process in which a resolution of the input image ID is converted based on the angle information ANGLE. The image OD is the input image ID after its resolution is converted. Subsequently, the scaler unit 102 outputs the generated image OD. The image OD is recorded in a storage unit (not shown) or displayed by a display unit (not shown).

Figure 2:
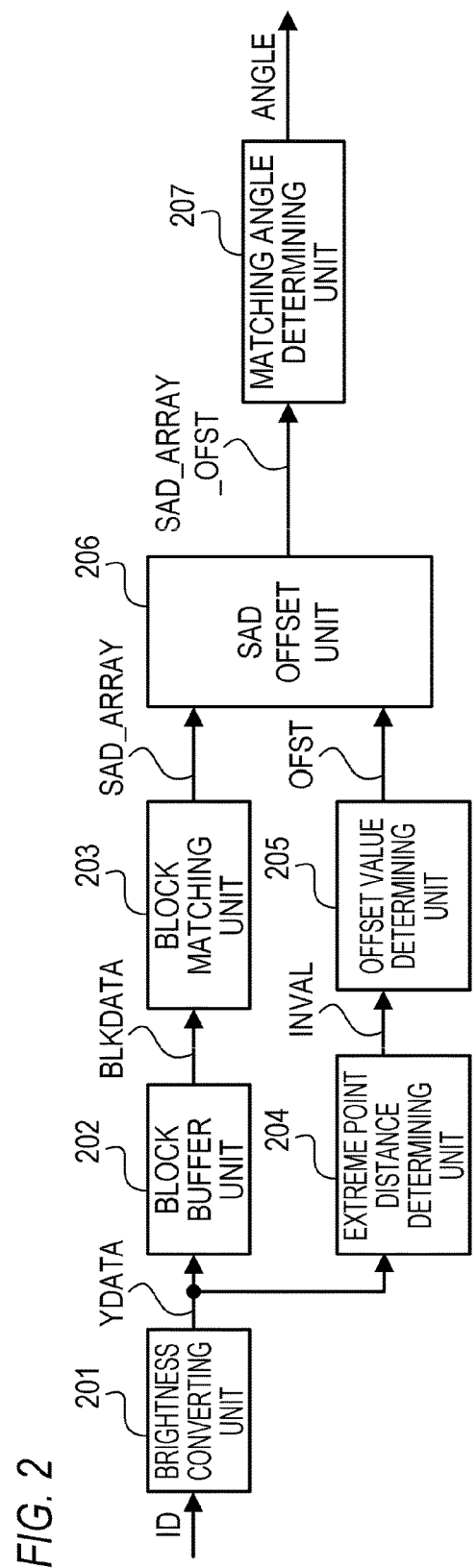
FIG. 2 is a block diagram showing an example of a configuration of an edge detecting unit according to the first embodiment.

Next, the edge detecting unit 101 will be described in detail. FIG. 2 is a block diagram showing an example of a configuration of the edge detecting unit 101. As shown in FIG. 2, the edge detecting unit 101 includes a brightness converting unit 201, a block buffer unit 202, a block matching unit 203, an extreme point distance determining unit 204, an offset value determining unit 205, a SAD offset unit 206, and a matching angle determining unit 207.

The brightness converting unit 201 converts each pixel value of the input image ID into a brightness value YDATA, and sequentially outputs the respective brightness values YDATA to the block buffer unit 202 and the extreme point distance determining unit 204. In a case where a pixel value of the input image ID is a YCbCr value (a combination of a Y value, a Cb value, and a Cr value), the brightness converting unit 201 uses the Y value of the input image ID as the brightness value YDATA. In a case where a pixel value of the input image ID is an RGB value (a combination of an R value, a G value, and a B value), the brightness converting unit 201 converts the RGB value of the input image ID into the brightness value YDATA. For example, the brightness value YDATA is calculated using Expression 1 below.

$$Y\text{DATA}=0.2 \times R \text{ value} + 0.7 \times G \text{ value} + 0.1 \times B \text{ value} \quad \text{(Expression 1)}$$

The block buffer unit 202 stores the brightness value YDATA output from the brightness converting unit 201 and outputs the stored brightness value YDATA to the block matching unit 203. In the present embodiment, the block buffer unit 202 includes a line memory and accumulates the brightness values YDATA in the line memory. In addition, the block buffer unit 202 reads brightness values YDATA corresponding to X horizontal pixels×Y vertical lines from the line memory, and outputs the read brightness values YDATA as block data BLKDATA to the block matching unit 203. In the present embodiment, an example in which X=20 and Y=4 will be described.

In the present embodiment, an image region corresponding to the block data BLKDATA is used as a detection area. The detection area is an image region in which the input image ID is referred in detecting an edge at a position of interest. In the present embodiment, the detection area is an image region based on a position of interest. Specifically, the detection area is an image region centered on the position of interest.

Alternatively, an image region corresponding to the block data BLKDATA may differ from the detection area. A positional relationship among the position of interest, the detection area, and an image region corresponding to the block data BLKDATA is not particularly limited. Both a size of the image region corresponding to the block data BLKDATA and a size of the detection area are not particularly limited. In a similar manner, both a shape of the image region corresponding to the block data BLKDATA and a shape of the detection area are not particularly limited.

The block matching unit 203 performs block matching using the input image ID in the detection area. In the present embodiment, block matching using the brightness value YDATA of the input image ID is performed. Alternatively, another gradation value (an R value, a G value, a B value, a Cb value, a Cr value, or the like) which differs from the brightness value YDATA or a plurality of types of gradation values may be used in block matching.

Figure 3:
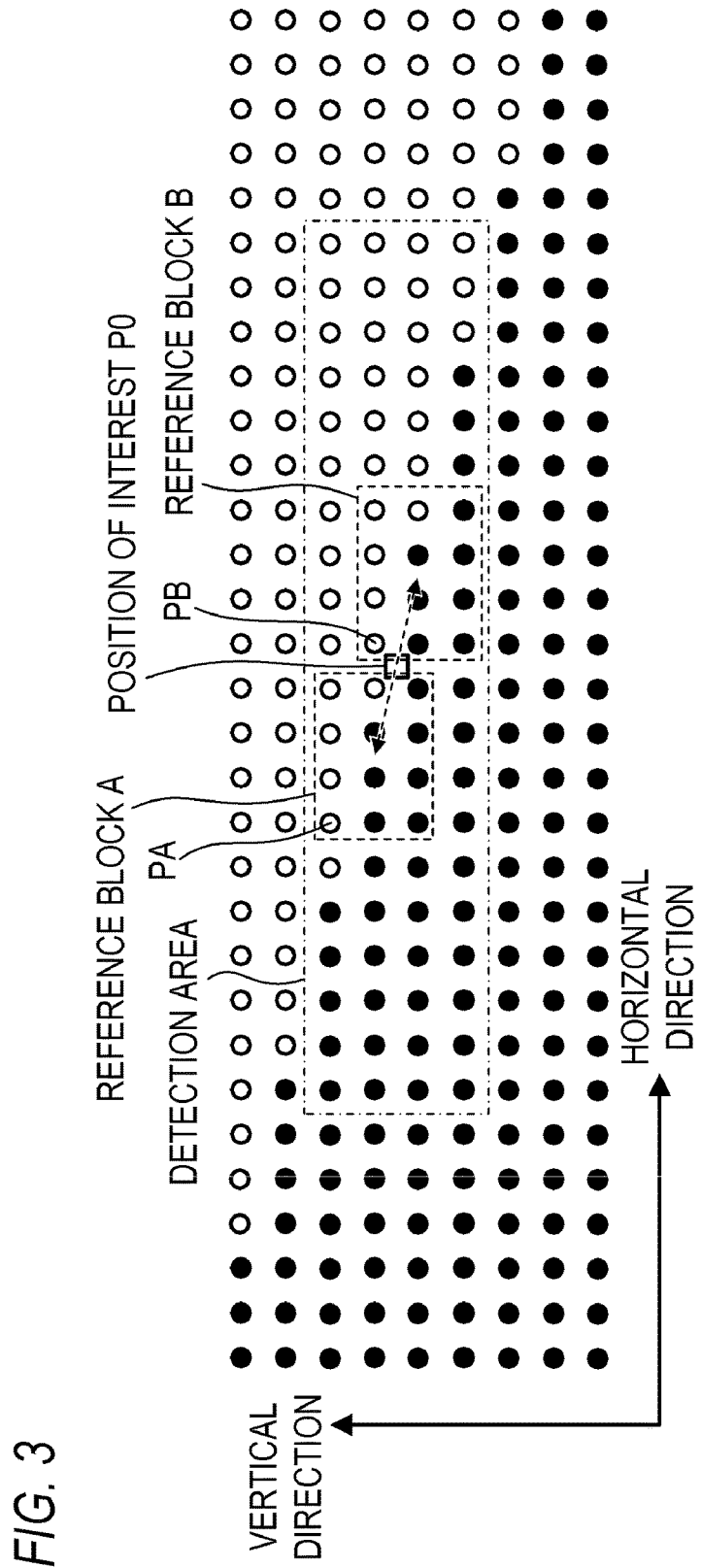
FIG. 3 is a diagram showing an example of block matching according to the first embodiment.

In the present embodiment, as shown in FIG. 3, the block matching unit 203 sets two reference blocks A and B with respect to a position of interest P0, and compares the input image ID (the brightness value YDATA) in the reference block A with the input image ID in the reference block B. Accordingly, a degree of similarity or a degree of dissimilarity between the input image ID in the reference block A and the input image ID in the reference block B is determined as a comparison value.

Specifically, the block matching unit 203 calculates, for each of a plurality of pixels in the reference block A, an absolute value of a difference (an absolute difference) between the brightness value YDATA of the pixel and the brightness value YDATA of a pixel in the reference block B. In a case of obtaining an absolute difference with respect to a pixel PA in the reference block A, a pixel PB of which a positional relationship with the reference block B is equivalent to a positional relationship between the reference block A and the pixel PA is used among the plurality of pixels in the reference block B. In addition, the block matching unit 203 calculates a SAD value (a sum of absolute differences) which is a sum of a plurality of obtained absolute differences as the comparison value. The SAD value corresponds to a degree of dissimilarity (an inverse of a degree of similarity) between the input image ID in the reference block A and the input image ID in the reference block B. Alternatively, a degree of similarity such as an inverse of a SAD value may be calculated as the comparison value.

A center position of the reference block A is positioned on a side of one of two directions perpendicular to a predetermined direction with respect to the position of interest P0, and a center position of the reference block B is positioned on a side of the other of the two directions perpendicular to the predetermined direction with respect to the position of interest P0. In addition, a center position in a predetermined direction of a reference block pair (a combination of the reference block A and the reference block B) coincides with a position in the predetermined direction of the position of interest P0. In the present embodiment, a horizontal direction is used as the predetermined direction. Therefore, the center position of the reference block A is positioned on an upper side with respect to the position of interest P0, and the center position of the reference block B is positioned on a lower side with respect to the position of interest P0. In addition, the center position of the reference block pair in the horizontal direction coincides with a horizontal position (a position in the horizontal direction) of the position of interest P0. A positional relationship between the reference blocks A and B corresponds to an edge (a direction of an edge).

The block matching unit 203 sets the reference block pair in plurality and calculates a plurality of SAD values respectively corresponding to the plurality of reference block pairs. In the present embodiment, the block matching unit 203 sets a plurality of reference block pairs in which positional relationships between the reference blocks A and B in the horizontal direction (the predetermined direction) differ from each other by changing horizontal positions of the reference blocks A and B in the detection area. Specifically, the block matching unit 203 sets 17 reference block pairs of which block distances n are −16, −14, −12, −10, −8, −6, −4, −2, 0, +2, +4, +6, +8, +10, +12, +14, and +16. In addition, the block matching unit 203 calculates 17 SAD values SAD_ARRAY(n) respectively corresponding to the 17 reference block pairs and outputs the plurality of (17) SAD values calculated with respect to the target position to the SAD offset unit 206.

An absolute value of the block distance n is a distance in the horizontal direction (the predetermined direction) between the center position of the reference block A and the center position of the reference block B. As described earlier, the center position of the reference block pair in the horizontal direction coincides with the horizontal position of the position of interest P0. Therefore, ½ of |n| (the absolute value of the block distance n) is a distance in the horizontal direction between the position of interest P0 and the center position of the reference block A and is also a distance in the horizontal direction between the position of interest P0 and the center position of the reference block B. In addition, as described earlier, a positional relationship between the reference blocks A and B corresponds to an edge. Therefore, the distances described above (the distance from the position of interest P0 to the center position of the reference block A (or the reference block B), the block distance n, and the like) correspond to edges.

In the present embodiment, in a case where the center position of the reference block A is on a right side of the position of interest P0, a positive value is used as the block distance n. In addition, in a case where the center position of the reference block A is on a left side of the position of interest P0, a negative value is used as the block distance n. FIG. 3 shows an example of a case where the block distance n is −4. In a case where the absolute value of the block distance n increases, an inclination angle of a corresponding edge relative to the vertical direction increases.

In FIG. 3, each of the reference blocks A and B is an image region constituted by 4 horizontal pixels×3 vertical pixels. In addition, the reference block A and the reference block B deviate from each other by one pixel in the vertical direction. It should be noted that sizes of the reference blocks A and B, a positional relationship of the reference blocks A and B in the vertical direction (a direction perpendicular to the predetermined direction), shapes of the reference blocks A and B, and the like are not particularly limited.

The extreme point distance determining unit 204 determines, based on the input image ID, at least one of a local maximum point distance and a local minimum point distance (an extreme point distance determination process). In addition, the extreme point distance determining unit 204 outputs an extreme point distance INVAL which is a result of a determination of at least one of a local maximum point distance and a local minimum point distance to the offset value determining unit 205. A local maximum point distance is a distance between local maximum pixels which are pixels of which gradation values are local maximum values, and a local minimum point distance is a distance between local minimum pixels which are pixels of which gradation values are local minimum values. Specifically, a local maximum point distance is a distance between two adjacent local maximum pixels, and a local minimum point distance is a distance between two adjacent local minimum pixels. A local maximum pixel can also be described as "a pixel at which a change in a gradation value between pixels changes from increase to decrease", and a local minimum pixel can also be described as "a pixel at which a change in a gradation value between pixels changes from decrease to increase". In the present embodiment, the extreme point distance determining unit 204 determines at least one of a local maximum point distance and a local minimum point distance based on the input image ID in a determination area. According to such a process, pixels in the determination area can be used for both a local maximum pixel and a local minimum pixel. As a result, a distance between local maximum pixels in the determination area can be obtained as a local maximum point distance and a distance between local minimum pixels in the determination area can be obtained as a local minimum point distance.

The determination area is an image region in which the input image ID is referred to in the extreme point distance determination process. In the present embodiment, the determination area is an image region based on the position of interest P0. For example, the determination area is an image region in a periphery of the position of interest P0. Specifically, the determination area is an image region of one line above the position of interest P0 and is also an image region of which a center position in the horizontal direction (the predetermined direction) coincides with the position of interest P0.

It should be noted that a positional relationship between the position of interest P0 and the determination area, a size of the determination area, a shape of the determination area, and the like are not particularly limited. A common determination area may be shared among a plurality of positions of interest. An entire image region of the input image ID may be used as the determination area. The image processing apparatus may further include a functional unit which sets a size of a detection area and a functional unit which sets a size of a determination area. In this case, the size of the determination area is favorably set in accordance with a size of the detection area. For example, favorably, the larger the size of the detection area, a larger size is set as the size of the determination area. An arbitrary size specified by a user may be set as a size of the detection area. A size of the detection area may be automatically set in accordance with a type (a photograph, an illustration, or the like) of the input image ID, a use environment of a display unit which displays the image OD (a viewing environment of the image OD or the like), or the like. An arbitrary size specified by the user may be set as a size of the determination area. Alternatively, a size of the determination area may be automatically set in accordance with the type of the input image ID, the use environment of the display unit, or the like.

In the present embodiment, a local maximum pixel is a pixel of which the brightness value YDATA is a local maximum value and a local minimum pixel is a pixel of which the brightness value YDATA is a local minimum value. In addition, in the present embodiment, a local maximum pixel is a pixel of which a gradation value is a local maximum value in a change in the gradation value in the horizontal direction (the predetermined direct ion) and a local minimum pixel is a pixel of which a gradation value is a local minimum value in a change in the gradation value in the horizontal direction (the predetermined direction).

It should be noted that a local maximum pixel and a local minimum pixel are not limited to the pixels described above. For example, a local maximum pixel and a local minimum pixel may be pixels which take another gradation value (an R value, a G value, a B value, a Cb value, a Cr value, or the like) which differs from the brightness value YDATA into consideration. Specifically, a local maximum pixel may be a pixel of which the G value is a local maximum value and a local minimum pixel may be a pixel of which the G value is a local minimum value. A local maximum pixel may be a pixel of which a gradation value is a local maximum value in a change in the gradation value in an in-plane direction (a two-dimensional direction) and a local minimum pixel may be a pixel of which a gradation value is a local minimum value in a change in the gradation value in the in-plane direction.

Figure 4:
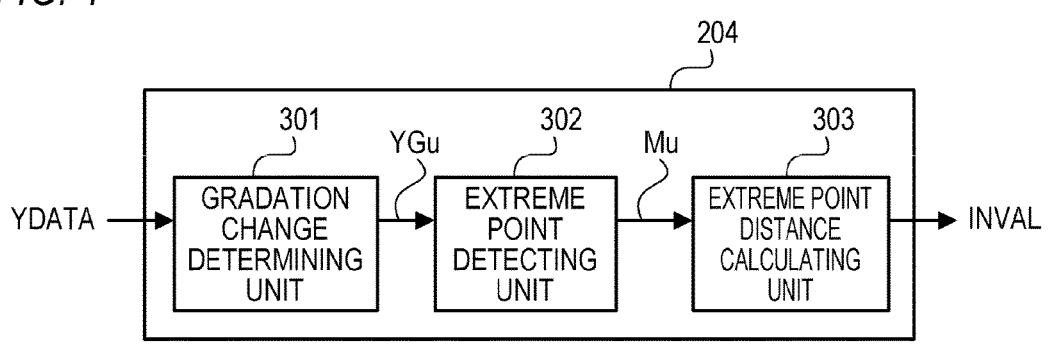
FIG. 4 is a block diagram showing an example of a configuration of an extreme point distance determining unit according to the first embodiment.

The extreme point distance determining unit 204 will now be described in detail. FIG. 4 is a block diagram showing an example of a configuration of the extreme point distance determining unit 204. As shown in FIG. 4, the extreme point distance determining unit 204 includes a gradation change determining unit 301, an extreme point detecting unit 302, and an extreme point distance calculating unit 303.

The gradation change determining unit 301 determines, based on a difference in brightness values YDATA between pixels adjacent to each other (adjacent pixels) in the horizontal direction among a plurality of pixels in the determination area, a change in a gradation value between the adjacent pixels. In addition, the gradation change determining unit 301 outputs a gradation change value YGu(j) indicating a result of the determination of a gradation change (a change in a gradation value) to the extreme point detecting unit 302. The gradation change value YGu(j) is a value based on a difference between a brightness value yu(j) of a pixel u(j) and a brightness value yu(j−1) of a pixel u(j−1) which is adjacent to a left side of the pixel u(j). The pixel u(j) is a pixel in the determination area and is also a pixel on a line U which is one line above the position of interest P0. In the present embodiment, among a plurality of pixels u(j) which are present on a left side of the position of interest P0, 0 (zero) is used as a value j of the pixel u(j) which is closest to the position of interest P0. In addition, the value j is decremented by one toward the left and incremented by one toward the right. In the present embodiment, an image region constituted by 12 pixels u(j) which respectively correspond to 12 values j from −5 to +6 is used as the determination area. Furthermore, 12 gradation change values YGu(j) respectively corresponding to the 12 pixels u(j) are obtained.

First, using Expression 2 below, the gradation change determining unit 301 calculates a difference ygu1(j) between the brightness value yu(j) of the pixel u(j) and the brightness value yu(j−1) of the pixel u(j−1) which is adjacent to the left side of the pixel u(j).

$$ygul(j)=yu(j)-yu(j-1) \quad \text{(Expression 2)}$$

Next, based on the difference ygul(j), the gradation change determining unit 301 determines a change in a gradation value from the pixel u(j−1) to the pixel u(j). Specifically, based on the difference ygul(j), the gradation change determining unit 301 determines whether the change in the gradation value is "UP" or "DOWN". "UP" means that the brightness value YDATA (the gradation value) increases from the pixel u)j−1) to the pixel u(j). "DOWN" means that the brightness value YDATA decreases from the pixel u(j−1) to the pixel u(j).

In the present embodiment, in a case where the difference ygul(j) has a positive value, the gradation change determining unit 301 determines that the change in the gradation value is "UP" and sets the gradation change value YGu(j) to 0. In a case where the difference ygul(j) has a negative value, the gradation change determining unit 301 determines that the change in the gradation value is "DOWN" and sets the gradation change value YGu(j) to 1. In a case where the difference ygul(j) is 0 (zero), the gradation change determining unit 301 adopts a same determination result as the determination result with respect to the pixel u(j−1) as the determination result with respect to the pixel u(j), and sets a same value as a gradation change value YGu(j−1) as the gradation change value YGu(j).

The gradation change determining unit 301 performs the process described above for each of the 12 pixels u(j) described earlier. It should be noted that the process performed by the gradation change determining unit 301 is not limited to the process described above. For example, the difference ygul(j) may be used as the gradation change value YGu(j). In a case where the difference ygul(j) is larger than an increase threshold, the change in the gradation value may be determined as "UP", and in a case where the difference ygul(j) is smaller than a decrease threshold, the change in the gradation value may be determined as "DOWN". In addition, in a case where the difference ygul(j) is neither, a same determination result as the determination result with respect to the pixel u(j−1) may be adopted as a determination result with respect to the pixel u(j). As the increase threshold, a value equal to or larger than 0 (zero) can be used. As the decrease threshold, a value equal to or smaller than 0 (zero) can be used. The increase threshold and the decrease threshold may both be 0 (zero).

Figure 5:
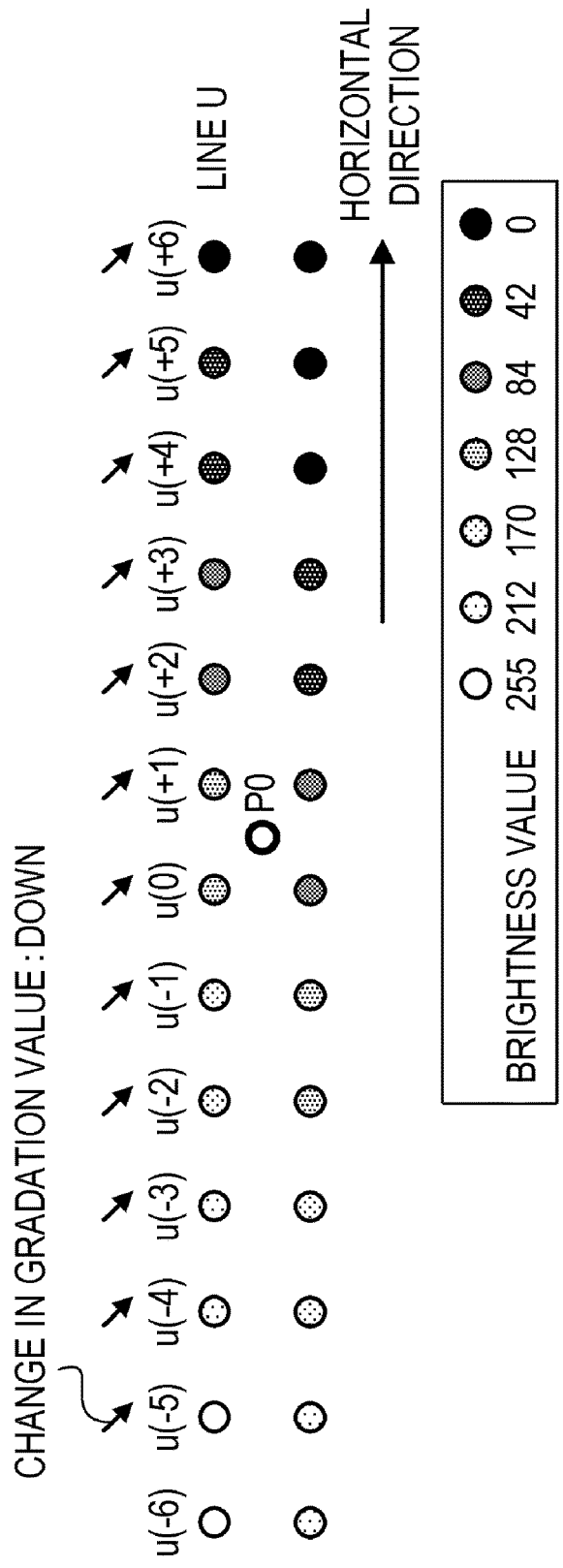
FIG. 5 is a diagram showing a specific example of a process by the extreme point distance determining unit according to the first embodiment.
Figure 6:
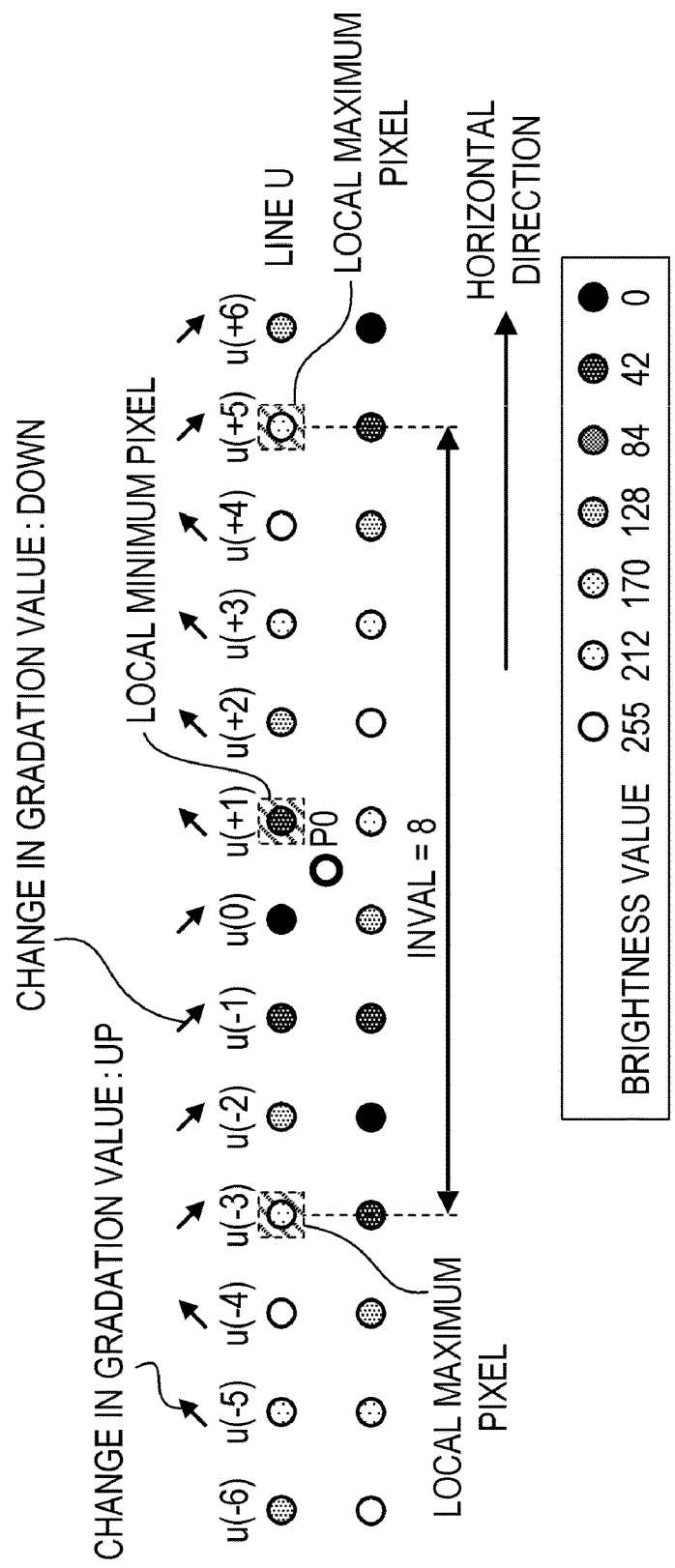
FIG. 6 is a diagram showing a specific example of a process by the extreme point distance determining unit according to the first embodiment.

A specific example of the process by the gradation change determining unit 301 will be described with reference to FIGS. 5 and 6. FIG. 5 shows an example in a case where the position of interest P0 is set in an image region which does not include a periodic pattern. FIG. 6 shows an example in a case where the position of interest P0 is set in an image region which includes a periodic pattern. A periodic pattern is a pattern in which a same pictorial pattern is periodically arranged in an image space. A periodic pattern can also be described as "a pattern in which pixel values change periodically in an image space".

While the number of bits of the brightness value yu(j)(the brightness value YDATA) is not particularly limited, FIGS. 5 and 6 show an example of a case where the brightness value yu(j) is an 8-bit value (0 to 255). In addition, in FIGS. 5 and 6, the brightness value yu(j) is expressed in colors such that, as the brightness value yu(j) increases, a color thereof changes from white to black. FIGS. 5 and 6 also show a correspondence relationship between colors expressing the brightness value yu(j) and specific values of the brightness value yu(j). In FIGS. 5 and 6, the pixel u(j) with which a rightward-ascending arrow is associated is a pixel at which a change in the gradation value is determined as "UP", and the pixel u(j) with which a rightward-descending arrow is associated is a pixel at which a change in the gradation value is determined as "DOWN".

An example in which a determination result of "DOWN" is obtained will now be described with reference to FIG. 5. A process related to a pixel u(−2) in FIG. 5 will be described. A brightness value yu(−2) of the pixel u(−2) is 170 and a brightness value yu(−3) of a pixel u(−3) is 212. Therefore, a difference ygul(−2) of 170−212=−42 is calculated and a gradation change value YGu(−2 of (DOWN)) is set. A process related to a pixel u(−1) in FIG. 5 will be described. A brightness value yu(−1) of the pixel u(−1) is 170 which is the same as the brightness value yu(−2). Therefore, a difference ygul(−1) of 170−170=0 is calculated and a gradation change value YGu(−1) is set such that gradation change value YGu(−1)=gradation change value YGu(−2)=1 (DOWN). An example in which a determination result of "UP" is obtained will now be described with reference to FIG. 6. A process related to a pixel u(+1) in FIG. 6 will be described. A brightness value yu(+1) of the pixel u(+1) is 42 and a brightness value yu(0) of a pixel u(0) is 0. Therefore, a difference ygul(+1) of 42−0=42 is calculated and a gradation change value YGu(+1) of 0 (UP) is set.

The extreme point detecting unit 302 detects a local maximum pixel and a local minimum pixel from a plurality of pixels in the determination area based on the gradation change value YGu(j) obtained by the gradation change determining unit 301. In addition, the extreme point detecting unit 302 outputs an extreme value determination value Mu(j) which indicates a result of detection of a local maximum pixel and a local minimum pixel to the extreme point distance calculating unit 303. In the present embodiment, in a case where Condition 1 below is satisfied, the extreme point detecting unit 302 determines that the pixel u(j) is a local maximum pixel and sets the extreme value determination value Mu(j) to 1. In a case where Condition 2 below is satisfied, the extreme point detecting unit 302 determines that the pixel u(j) is a local minimum pixel and sets the extreme value determination value Mu(j) to 2. In a case where Conditions 1 and 2 below are not satisfied, the extreme point detecting unit 302 determines that the pixel u(j) is neither a local maximum pixel nor a local minimum pixel and sets the extreme value determination value Mu(j) to 0.

Gradation change value YGu(j)=1 (DOWN) and gradation change value YGu(j−1)=0 (UP)　　　Condition 1:

Gradation change value YGu(j)=0 (UP) and gradation change value YGu(j−1)=1 (DOWN)　　　Condition 2:

A specific example of a process by the extreme point detecting unit 302 will be described with reference to FIG. 6. A process related to a pixel u(−3) in FIG. 6 will be described. A gradation change value YGu(−3) of the pixel u(−3) is 1 (DOWN) and a gradation change value YGu(−4) of a pixel u(−4) is 0 (UP). In other words, the pixel u(−3) satisfies Condition 1. Therefore, the pixel u(−3) is determined to be a local maximum pixel and an extreme value determination value Mu(−3) of 1 is set. A process related to a pixel u(+1) in FIG. 6 will be described. A gradation change value YGu(+1) of the pixel u(+1) is 0 (UP) and a gradation change value YGu(0) of a pixel u(0) is 1 (DOWN). In other words, the pixel u(+1) satisfies Condition 2. Therefore, the pixel u(+1) is determined to be a local minimum pixel and an extreme value determination value Mu(+1) of 2 is set. A process related to a pixel u(−1) in FIG. 6 will be described. A gradation change value YGu(−1) of the pixel u(−1) is 1 (DOWN) and a gradation change value YGu(−2) of a pixel u(−2) is also 1 (DOWN). In other words, the pixel u(−1) satisfies neither Condition 1 nor Condition 2. Therefore, the pixel u(−1) is determined to be neither a local maximum pixel nor a local minimum pixel and an extreme value determination value Mu(−1) of 0 is set. It should be noted that, in the example shown in FIG. 5, since the gradation change value YGu(j) of 1 (DOWN) applies to all pixels u(j), neither a local maximum pixel nor a local minimum pixel is detected.

It should be noted that a method of detecting a local maximum pixel and a local minimum pixel is not limited to the method described above. For example, a local maximum pixel and a local minimum pixel may be detected using other methods of detecting a change in a gradation value in an image space.

The extreme point distance calculating unit 303 calculates at least one of a local maximum point distance and a local minimum point distance based on the extreme value determination value Mu(j) obtained by the extreme point detecting unit 302. In addition, the extreme point distance calculating unit 303 determines an extreme point distance INVAL based on a result of calculation of the local maximum point distance and the local minimum point distance, and outputs the extreme point distance INVAL to the offset value determining unit 205.

In the present embodiment, a local maximum pixel and a local minimum pixel are detected based on a change in the brightness value YDATA in the horizontal direction (the predetermined direction). Therefore, the extreme point distance calculating unit 303 calculates a distance between two local maximum pixels which are adjacent to each other in the horizontal direction (the predetermined direction) as a local maximum point distance, and calculates a distance between two local minimum pixels which are adjacent to each other in the horizontal direction (the predetermined direction) as a local minimum point distance. Specifically, the extreme point distance calculating unit 303 calculates, as a local maximum point distance, a distance between two local maximum pixels which sandwich the position of interest P0 in the horizontal direction (the predetermined direction) and which are adjacent to each other in the horizontal direction (the predetermined direction). In addition, the extreme point distance calculating unit 303 calculates, as a local minimum point distance, a distance between two local minimum pixels which sandwich the position of interest P0 in the horizontal direction (the predetermined direction) and which are adjacent to each other in the horizontal direction (the predetermined direction).

In a case where only one of a local maximum point distance and a local minimum point distance is calculated, the extreme point distance calculating unit 303 determines the calculated distance as the extreme point distance INVAL. In a case where both a local maximum point distance and a local minimum point distance are calculated, the extreme point distance calculating unit 303 determines a representative distance which is representative of the local maximum point distance and the local minimum point distance as the extreme point distance INVAL. In the present embodiment, the shorter of a local maximum point distance and a local minimum point distance is used as a representative distance. In a case where neither a local maximum point distance nor a local minimum point distance is calculated, the extreme point distance calculating unit 303 determines a predetermined value as the extreme point distance INVAL. The predetermined value may be any value which prevents a detection sensitivity for an edge from being partially changed. In the present embodiment, a value (32) obtained by multiplying a maximum value (+16) of the block distance n by 2 is used as the predetermined value.

A specific example of a process by the extreme point distance calculating unit 303 will be described with reference to FIGS. 5 and 6. In the example shown in FIG. 5, since neither a local maximum pixel nor a local minimum pixel is detected, the extreme point distance INVAL of 32 is obtained. In the example shown in FIG. 6, a pixel u(−3) and a pixel u(+5) which are adjacent to each other are local maximum pixels. In addition, in the horizontal direction, the pixel u(−3) and the pixel u(+5) sandwich the position of interest P0. As a result, a local maximum point distance of 8 is obtained. In the example shown in FIG. 6, since a pixel u(+1) is the only local minimum pixel, a local minimum point distance is not obtained. As a result, in the example shown in FIG. 6, the local maximum point distance of 8 is obtained as the extreme point distance INVAL.

It should be noted that a determination method of the extreme point distance INVAL is not limited to the method described above. For example, a local maximum point distance may always be used as the extreme point distance INVAL or a local minimum point distance may always be used as the extreme point distance INVAL. In a case where a local maximum point distance is always used as the extreme point distance INVAL, a local minimum pixel need not be detected. In a case where a local minimum point distance is always used as the extreme point distance INVAL, a local maximum pixel need not be detected. The representative distance may be the longer of a local maximum point distance and a local minimum point distance, an average distance of a local maximum point distance and a local minimum point distance, an intermediate distance of a local maximum point distance and a local minimum point distance, or the like.

For each of a plurality of combinations of two adjacent local maximum pixels, a distance between the two corresponding local maximum pixels may be calculated. In addition, a distance (a minimum distance, a maximum distance, an average distance, a modal distance, an intermediate distance, or the like) which is representative of the plurality of calculated distances may be used as a local maximum point distance. By using an average distance, a modal distance, an intermediate distance, or the like, an effect of noise with respect to a local maximum point distance and a local minimum point distance can be reduced. In a similar manner, for each of a plurality of combinations of two adjacent local minimum pixels, a distance between the two corresponding local minimum pixels can be calculated. In addition, a distance which is representative of the plurality of calculated distances may be used as a local minimum point distance. In a case where both a local maximum point distance and a local minimum point distance are obtained, information indicating both the local maximum point distance and the local minimum point distance may be output instead of the extreme point distance INVAL.

We now return to the description of the edge detecting unit 101. The offset value determining unit 205 sets a detection sensitivity for an edge based on a distance (at least one of a local maximum point distance and a local minimum point distance) determined by the extreme point distance determining unit 204. In the present embodiment, the offset value determining unit 205 sets a detection sensitivity for an edge in accordance with the extreme point distance INVAL obtained by the extreme point distance calculating unit 303. In the present embodiment, as a detection sensitivity, the offset value determining unit 205 sets (determines) an offset value OFST(n) which is a correction parameter for correcting a SAD value (a result of block matching) obtained by the block matching unit 203. Specifically, the offset value determining unit 205 determines 17 offset values OFST(n) for respectively correcting 17 SAD values SAD_ARRAY(n) obtained by the block matching unit 203. In addition, the offset value determining unit 205 outputs the determined offset values OFST(n) to the SAD offset unit 206. Alternatively, a value which differs from the correction parameter described above may be determined as a detection sensitivity. For example, "high", "intermediate", "low", and the like may be determined as detection sensitivities.

In the present embodiment, the image processing apparatus includes a storage unit (not shown) and a plurality of offset tables OFS_TBL respectively corresponding to a plurality of possible distances of the extreme point distance INVAL are stored in the storage unit in advance. The offset table OFS_TBL is a table which indicates a correspondence relationship between the block distance n and the offset value OFST(n). It should be noted that a function or the like indicating the correspondence relationship between the block distance n and the offset value OFST(n) may be used instead of the offset table OFS_TBL.

The offset value determining unit 205 reads the offset table OFS_TBL corresponding to the extreme point distance INVAL obtained by the extreme point distance calculating unit 303 from the storage unit described above (selection of the offset table OFS_TBL). Subsequently, the offset value determining unit 205 determines the offset value OFST(n) in accordance with the read offset table OFS_TBL.

Although details will be given later, in the present embodiment, a detection sensitivity for an edge corresponding to the block distance n is reduced at a degree of reduction such that, the larger the offset value OFST(n), the higher the degree of reduction. In other words, the larger the offset value OFST(n), the lower the detection sensitivity for an edge corresponding to the block distance n. Therefore, the process of setting the offset value OFST(n) can be described as "process of setting a detection sensitivity".

While the correspondence relationship between the block distance n and the detection sensitivity for an edge is not particularly limited, in the present embodiment, the offset value OFST(n) is set (determined) so as to satisfy Condition 3 below. In Condition 3, a "first distance" is a "distance based on a distance determined by the extreme point distance determining unit 204". In the present embodiment, the "first distance" is the extreme point distance INVAL. It should be noted that the "first distance" may differ from the extreme point distance INVAL. A first range can also be described as a "range of the block distance n, where |n| is equal to or smaller than ½ of the extreme point distance INVAL".

Condition 3: A detection sensitivity for an edge corresponding to a first range of which a distance (½ of |n|) from the position of interest P0 is equal to or shorter than a first distance is higher than a detection sensitivity for an edge corresponding to a second range of which a distance from the position of interest P0 is longer than the first distance.

Specifically, the second range includes: a third range of which a distance from the position of interest P0 is longer than the first distance and shorter than a second distance; and a fourth range of which a distance from the position of interest P0 is equal to or longer than the second distance. In addition, the offset value OFST(n) is set (determined) so as to satisfy Conditions 4 to 6 below.

Condition 4: A first detection sensitivity is used as a detection sensitivity for an edge corresponding to the first range.

Condition 5: A detection sensitivity which decreases from the first detection sensitivity to a second detection sensitivity as the distance from the position of interest P0 increases is used as a detection sensitivity for an edge corresponding to the third range.

Condition 6: The second detection sensitivity is used as a detection sensitivity for an edge corresponding to the fourth range.

An example of a calculation formula of the offset value OFST(n) which satisfies Conditions 4 to 6 is Expression 3 below. In Expression 3, "ATH" denotes a threshold for dividing the second range into the third range and the fourth range. "|n|≤INVAL/2" corresponds to the first range, and "OFST(n)=0" corresponds to the first detection sensitivity. "|n|≥ATH" corresponds to the fourth range, and "OFST(n)=OFST_MAX" corresponds to the second detection sensitivity. "INVAL/2<|n|<ATH" corresponds to the third range, and "OFST(n)=m" corresponds to the detection sensitivity which decreases from the first detection sensitivity to the second detection sensitivity as |n| increases.

Case of $|n|\text{INVAL}/2$: $\text{OFST}(n)=0$

Case of $\text{INVAL}/2<|n|<ATH$: $\text{OFST}(n)=m$

Case of $|n|\geq ATH$: OFST_MAX     (Expression 3)

Figure 7:
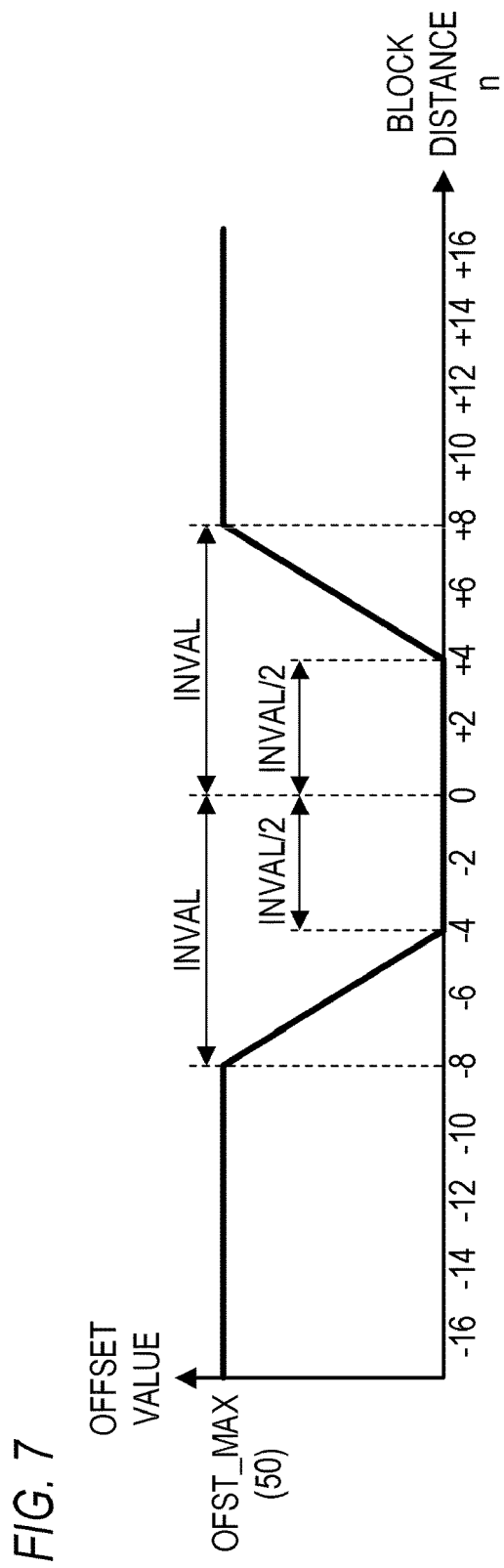
FIG. 7 is a diagram showing an example of an offset table according to the first embodiment.

FIG. 7 is a diagram showing an example of the offset table OFS_TBL corresponding to the extreme point distance INVAL of 8. In the example shown in FIG. 7, the threshold ATH is 8 (=INVAL). Since the extreme point distance INVAL is 8, a range expressed as −4≤n+4 is the first range and the offset value OFST(n) of 0 is set in the range of −4≤n≤+4. Since the threshold ATH is 8, a range expressed as n≥+8 and a range expressed as n≤−8 are the fourth range, and the offset value OFST(n) of OFST_MAX=50 is set in the range of n≥+8 and the range of n≤−8. In addition, a range expressed as +4<n<+8 is the third range, and the offset value OFST(n) which linearly increases from 0 to 50 as the block distance n increases is set in the range of +4<n<+8. A range expressed as −8<n<−4 is also the third range, and the offset value OFST(n) which linearly decreases from 50 to 0 as the block distance n increases is set in the range of −8<n<−4.

It should be noted that the threshold ATH, the offset value OFST(n) corresponding to the first detection sensitivity, and the offset value OFST(n) corresponding to the second detection sensitivity are not limited to the values described above. The process performed by the offset value determining unit 205 is not limited to the process described above. For example, a function such as that represented by Expression 3 may be determined in advance instead of a plurality of pieces of information (tables and/or functions) indicating the correspondence relationship between the block distance n and the offset value OFST(n). In this case, an arbitrary value specified by the user may be set as the threshold ATH. Alternatively, the threshold ATH may be automatically set in accordance with the type of the input image ID, the use environment of the display unit, or the like. In a similar manner, an arbitrary value specified by the user may be set as the offset value OFST_MAX. Alternatively, the offset value OFST_MAX may be automatically set in accordance with the type of the input image ID, the use environment of the display unit, or the like. In the third range, the offset value OFST(n) may increase nonlinearly as |n| increases. The offset value OFST(n) may be determined so as to satisfy Condition 3 and but not satisfy Condition 4.

The SAD offset unit 206 corrects, using the offset value OFST(n) obtained by the offset value determining unit 205, a SAD value (a result of block matching) obtained by the block matching unit 203. In the present embodiment, the SAD offset unit 206 corrects, using the 17 offset values OFST(n) determined by the offset value determining unit 205, the 17 SAD values SAD_ARRAY(n) calculated by the block matching unit 203. Specifically, as indicated by Expression 4 below, the SAD offset unit 206 adds the offset value OFST(n) to the SAD value SAD_ARRAY(n) to calculate a SAD value SAD_ARRAY_OFST(n) after correction. Subsequently, the SAD offset unit 206 outputs the SAD value SAD_ARRAY_OFST(n) to the matching angle determining unit 207.

SAD_ARRAY_OFST(*n*)=SAD_ARRAY
(*n*)+OFST(*n*).                              (Expression 4)

While an example in which the offset value OFST(n) to be added to the SAD value SAD_ARRAY(n) is determined as a correction parameter for correcting the SAD value SAD_ARRAY(n) has been described in the present embodiment, this example is not restrictive. For example, a gain value by which the SAD value SAD_ARRAY(n) is to be multiplied may be determined as a correction parameter for correcting the SAD value SAD_ARRAY(n).

Figure 8:
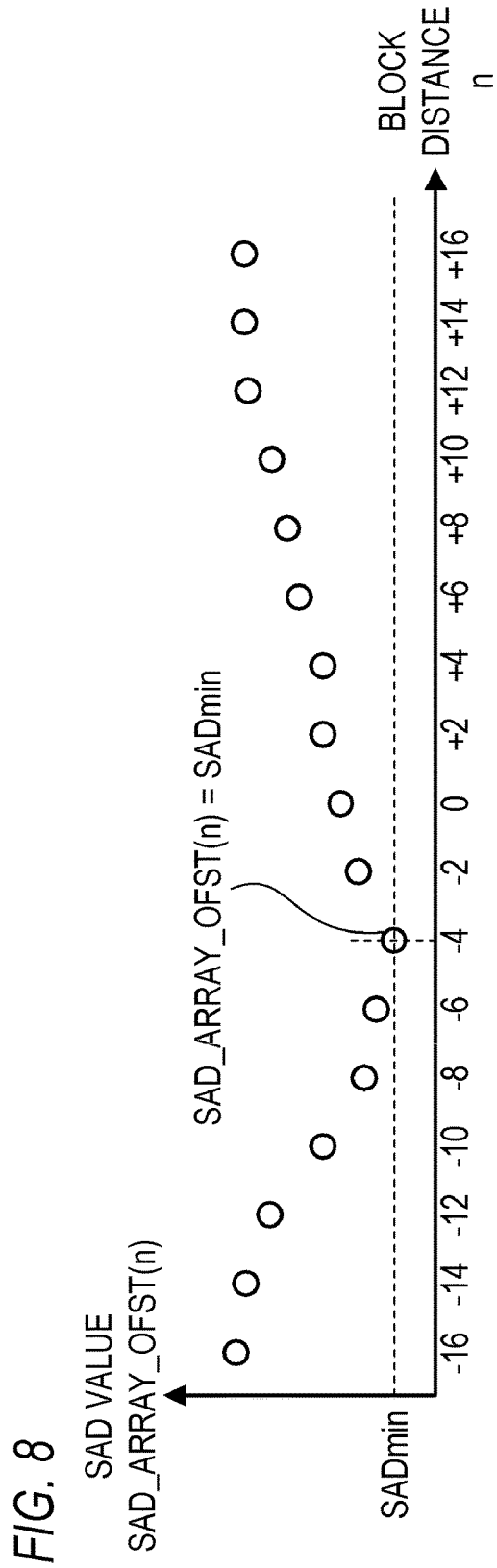
FIG. 8 is a diagram showing an example of a distribution of SAD values after correction according to the first embodiment.

The matching angle determining unit 207 detects an edge from the input image ID based on the 17 SAD_ARRAY_OFST(n)(a result after correction of block matching) output from the SAD offset unit 206. In the present embodiment, the matching angle determining unit 207 determines angle information ANGLE in accordance with a minimum value SADmin among the 17 SAD_ARRAY_OFST(n) output from the SAD offset unit 206. In addition, the matching angle determining unit 207 outputs the determined angle information ANGLE to the scaler unit 102. Specifically, the matching angle determining unit 207 determines n of the SAD value SAD_ARRAY_OFST(n) which is the minimum value SADmin as the angle information ANGLE. For example, in a case where a distribution of SAD values SAD_ARRAY_OFST(n) is a distribution shown in FIG. 8, the angle information ANGLE of −4 is obtained.

As described above, in the present embodiment, an edge is detected from the input image ID using the SAD value SAD_ARRAY_OFST(n) after being corrected based on a distance (at least one of a local maximum point distance and a local minimum point distance) determined by the extreme point distance determining unit 204. Therefore, the process of determining the angle information ANGLE based on the SAD value SAD_ARRAY_OFST(n) can be described as a "process of detecting an edge from the input image ID with a detection sensitivity based on a distance determined by the extreme point distance determining unit 204". The process of determining the angle information ANGLE based on the SAD value SAD_ARRAY_OFST(n) can also be described as a "process of detecting an edge from the input image ID with a detection sensitivity set (determined) by the offset value determining unit 205".

It should be noted that a detection method of an edge is not particularly limited as long as the edge is detected with a detection sensitivity based on a distance determined by the extreme point distance determining unit 204. For example, a process of setting a detection sensitivity, a process of correcting a SAD value, and the like may be omitted.

Specifically, the image processing apparatus may not include the offset value determining unit 205, the SAD offset unit 206, and the like. In addition, the SAD offset unit 206 may detect an edge based on the extreme point distance INVAL and the SAD value SAD_ARRAY(n) before correction.

Next, a specific example of an effect produced by the present embodiment will be described. A case where a minimum value of a plurality of SAD values SAD_ARRAY (n) (SAD values before correction) is used as the minimum value SADmin described above will now be considered. In a case where the position of interest P0 is set in an image region including a periodic pattern, a plurality of SAD values SAD_ARRAY(n) may be detected as the minimum value SADmin. In a case where a plurality of SAD values SAD_ARRAY(n) are detected as the minimum value SADmin, which of the plurality of SAD values SAd_ARRAY(n) that are the minimum value SADmin corresponds to an accurate edge cannot be determined. As a result, an edge may be falsely detected.

There is also a method of preferentially selecting the SAD value SAD_ARRAY(n) corresponding to a position close to the position of interest P0 (the block distance n of which |n| is small) among the plurality of SAD values SAD_ARRAY (n) equal to or smaller than a threshold. However, in a case where the position of interest P0 is set in an image region including an extremely shallow diagonal line, in addition to the SAD value SAD_ARRAY(n) corresponding to the diagonal line, other SAD values SAD_ARRAY(n) may also be small values. For example, the SAD value SAD_ARRAY (0) corresponding to an edge in the horizontal direction (|n|=0) may be a small value. Therefore, with the method described above which prioritizes a position close to the position of interest P0, an edge in the horizontal direction may be falsely detected instead of an edge corresponding to the extremely shallow diagonal line.

In consideration thereof, in the present embodiment, a detection sensitivity is adjusted using at least one of a local maximum point distance and a local minimum point distance so that only a SAD value corresponding to an accurate edge is adopted as the minimum value SADmin.

Figure 9A:
FIGS. 9A to 9C are diagrams showing an example of a problem which is solved by the first embodiment.
Figure 9B:
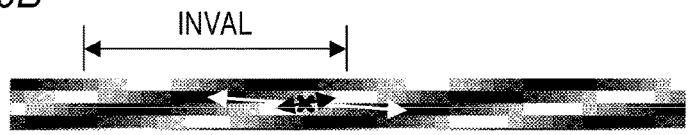
Figure 9C:
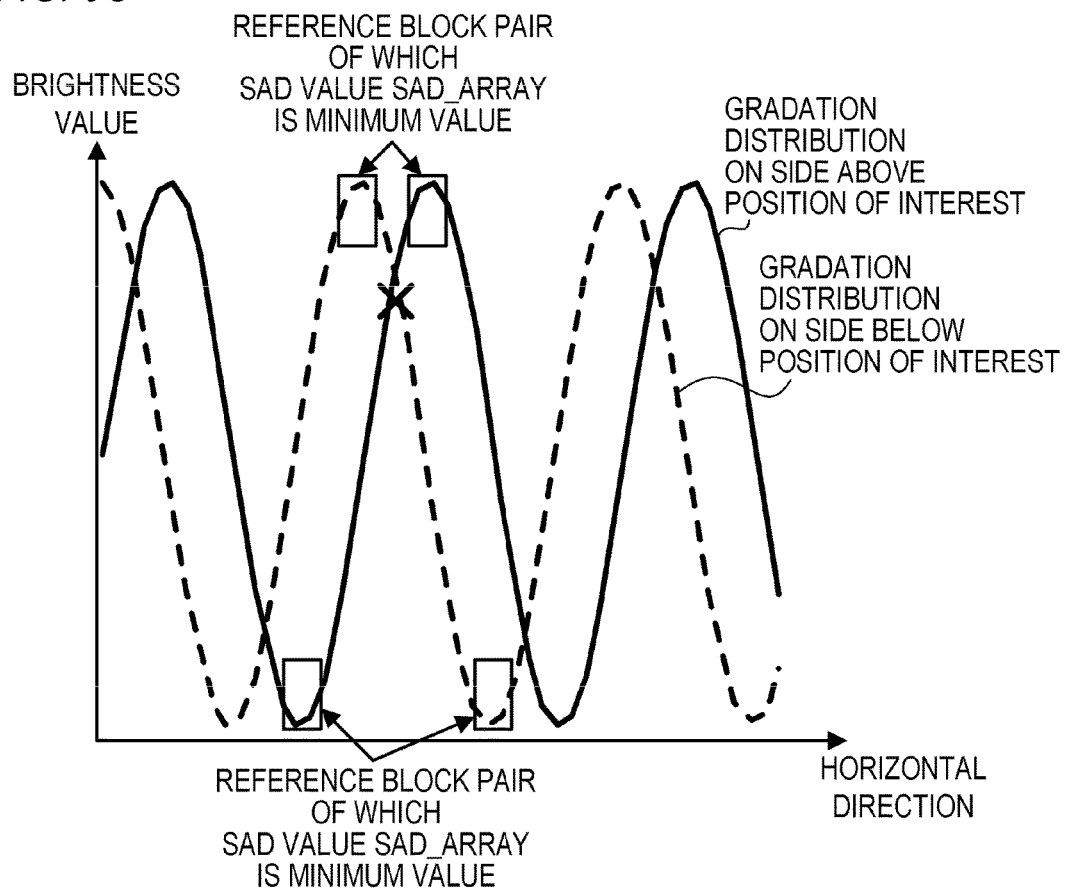

FIG. 9A is a diagram showing an example of a periodic pattern in which a rightward-ascending diagonal line is periodically arranged in an image space. FIG. 9B is a diagram showing a part of the periodic pattern shown in FIG. 9A. FIG. 9C is a diagram showing an example of a gradation distribution (a distribution of the brightness value YDATA) of the periodic pattern shown in FIG. 9B. Crosses in FIGS. 9B and 9C denote the position of interest P0. FIG. 9B shows two lines adjacent on an upper side to the position of interest P0 and two lines adjacent on a lower side to the position of interest P0. FIG. 9C shows a gradation distribution on the upper side of the position of interest P0 and a gradation distribution on the lower side of the position of interest P0. In this case, it is assumed that the extreme point distance INVAL of 18 is obtained.

Squares in FIG. 9C denote reference block pairs of which the SAD value SAD_ARRAY(n) is a minimum value. FIG. 9C shows that there are two reference block pairs of which the SAD value SAD_ARRAY(n) is a minimum value. One of the two reference block pairs corresponds to the block distance n of which |n| is equal to or smaller than ½ of the extreme point distance INVAL, and corresponds to an edge in a direction of a black arrow in FIG. 9B. The other of the two reference block pairs corresponds to the block distance n of which |n| is larger than ½ of the extreme point distance INVAL, and corresponds to an edge in a direction of a white arrow in FIG. 9B. The direction of the black arrow is an accurate direction which corresponds to the direction of the rightward-ascending diagonal line, and the direction of the white arrow is an inaccurate direction which does not correspond to the direction of the rightward-ascending diagonal line. As a result, in the method described above in which the minimum value of a plurality of SAD values SAD_ARRAY(n) is used as the minimum value SADmin, an edge in the direction of the white arrow is falsely detected.

In consideration thereof, in the present embodiment, a detection sensitivity for an edge corresponding to the block distance n of which |n| is larger than ½ of the extreme point distance INVAL is reduced. Accordingly, an edge in the direction of the white arrow can be detected more accurately.

Figure 10A:
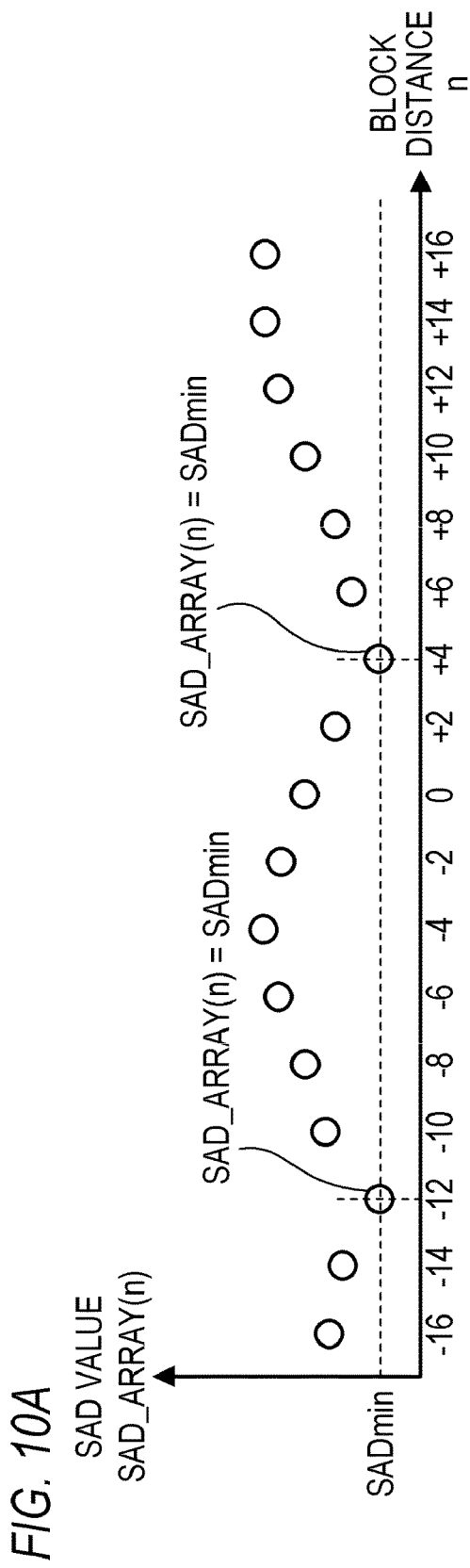

FIG. 10A is a diagram showing a distribution of the SAD values SAD_ARRAY(n) obtained from the image (periodic pattern) shown in FIG. 9B. In FIG. 10A, a SAD value SAD_ARRAY(−12) corresponding to a block distance n of −12 and a SAD value SAD_ARRAY(+4) corresponding to a block distance n of +4 are a minimum value. The SAD value SAD_ARRAY(−12)(block distance n=−12) corresponds to the edge in the direction of the white arrow in FIG. 9B, and the SAD value SAD_ARRAY(+4)(block distance n=+4) corresponds to the edge in the direction of the block arrow in FIG. 9B.

FIG. 10B is a diagram showing a distribution of the offset values OFST(n) obtained from the extreme point distance INVAL of 18. In FIG. 10B, an offset value OFST(−12) corresponding to the block distance n of −12 is larger than an offset value OFST(+4) corresponding to the block distance n of +4. Therefore, a detection sensitivity for an edge corresponding to the block distance n of −12 is reduced to a detection sensitivity which is lower than a detection sensitivity for an edge corresponding to the block distance n of +4.

FIG. 10C is a diagram showing a distribution of the SAD values SAD_ARRAY_OFST(n) obtained by correcting the SAD values SAD_ARRAY(n) shown in FIG. 10A using the offset values OFST(n) shown in FIG. 10B. In FIG. 10C, only the SAD value SAD_ARRAY_OFST(+4) corresponding to the block distance n of +4 is a minimum value. As a result, by using the minimum value of a plurality of SAD values SAD_ARRAY_OFST(n) as the minimum value SADmin described earlier, the edge in the direction of the white arrow in FIG. 9B can be prevented from being falsely detected and the edge in the direction of the black arrow in FIG. 9B can be detected.

Figure 11A:
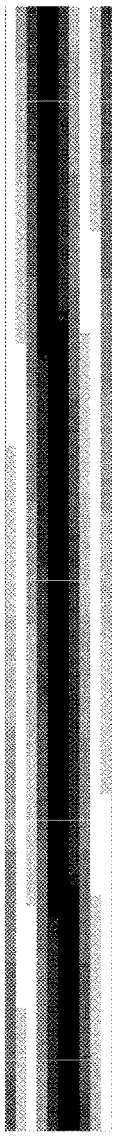
FIGS. 11A to 11C are diagrams showing an effect according to the first embodiment.
Figure 11B:
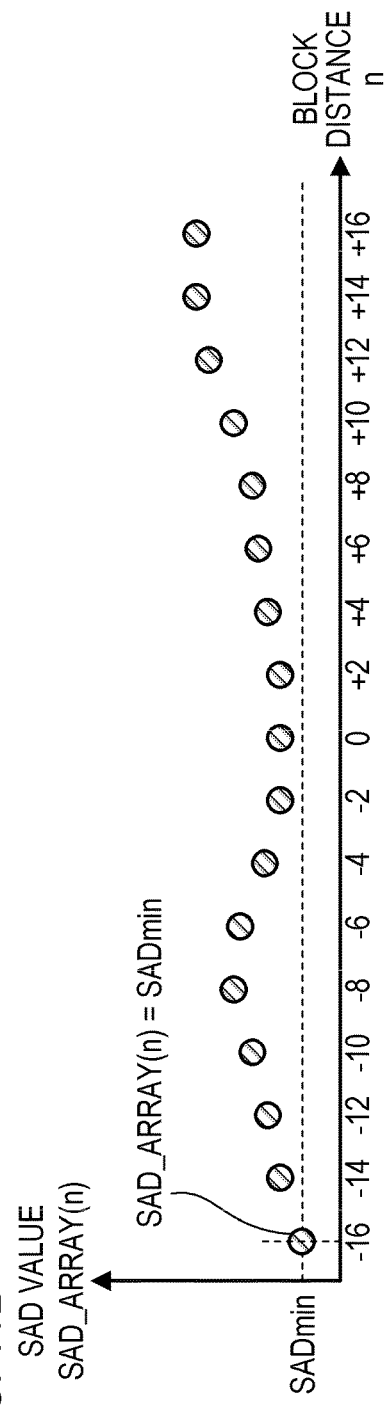

FIG. 11A is a diagram showing an example of an image of an extremely shallow diagonal line. FIG. 11B is a diagram showing a distribution of the SAD values SAD_ARRAY(n) obtained from the image shown in FIG. 11A. In FIG. 11B, only the SAD value SAD_ARRAY(−12) corresponding to the block distance n of −12 is a minimum value. The block distance n of −12 corresponds to an extremely shallow diagonal line (an accurate edge). However, a SAD value SAD_ARRAY(0) corresponding to the block distance n of 0 is also extremely small. The block distance n of 0 corresponds to the horizontal direction. Therefore, with the method described above which prioritizes a position close to the position of interest P0, an edge in the horizontal direction is falsely detected instead of an edge corresponding to the extremely shallow diagonal line.

Figure 11C:
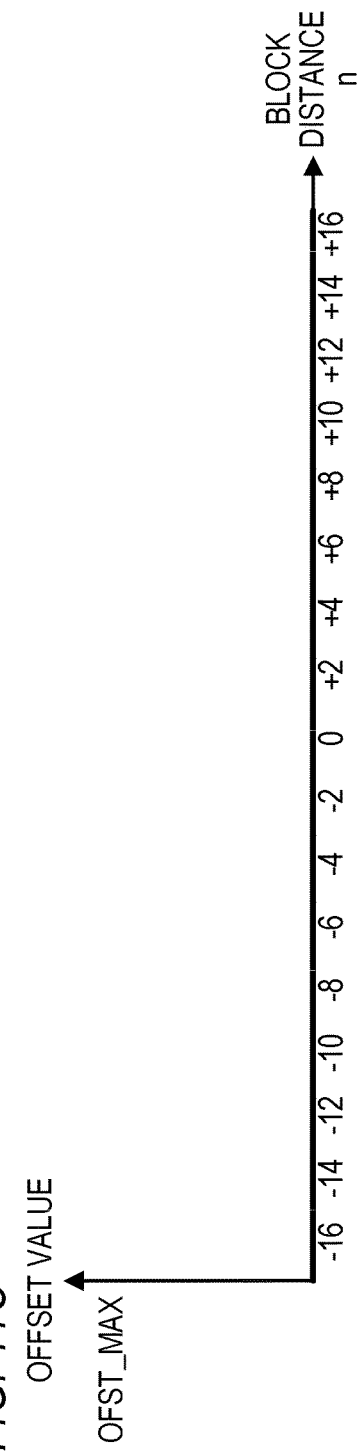

In the image of the extremely shallow diagonal line, a local maximum pixel and a local minimum pixel are not detected and a large value is set as the extremely shallow diagonal line INVAL. Therefore, as shown in FIG. 11C, the offset value OFST(n) of 0 is set for all block distances n and a detection sensitivity for an edge becomes uniform. As a result, as a distribution of the SAD values SAD_ARRAY_OFST(n), a same distribution as the distribution shown in FIG. 11B is obtained. In addition, in the present embodiment, since an edge corresponding to the minimum value SADmin of the plurality of SAD values SAD_ARRAY_OFST(n) is detected, a horizontal edge can be prevented from being falsely detected and an edge corresponding to the extremely shallow diagonal line can be detected.

As described above, according to the present embodiment, by adjusting a detection sensitivity using at least one of a local maximum point distance and a local minimum point distance, a false detection of an edge can be suppressed in various cases and an edge can be detected with high accuracy.

Figure 12:
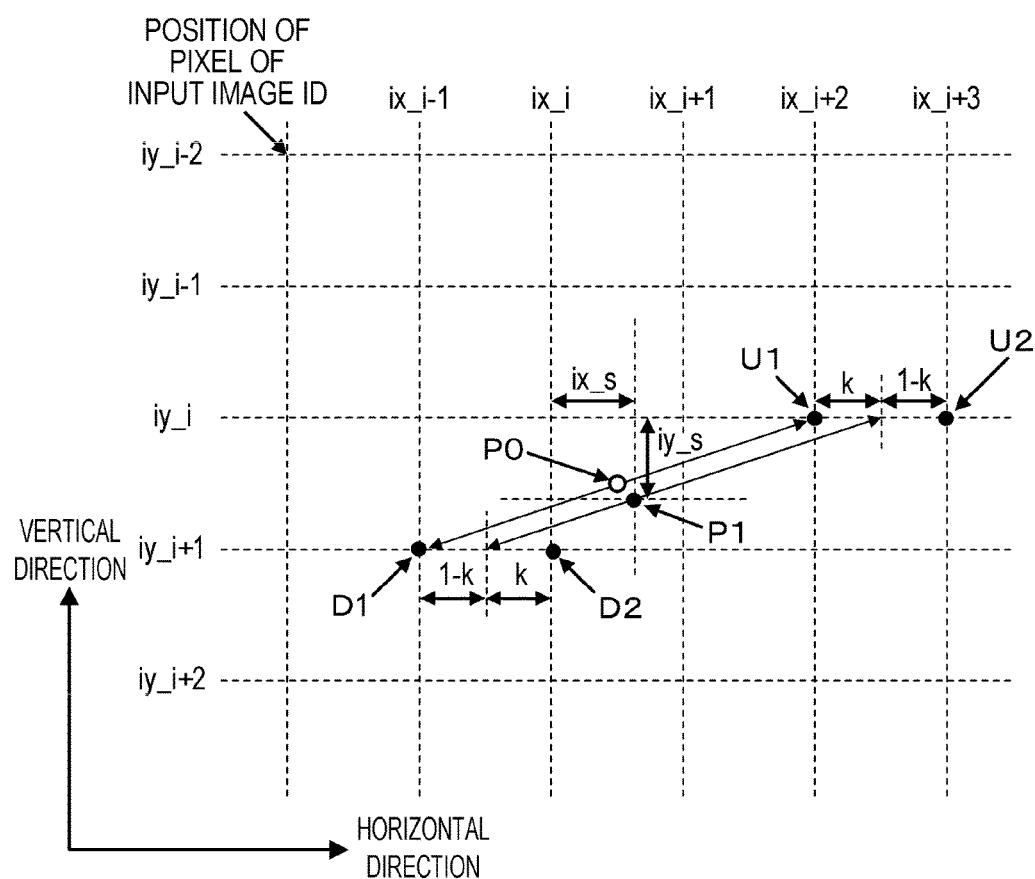
FIG. 12 is a diagram showing an example of a scaler process according to the first embodiment.

Next, the scaler unit 102 will be described in detail. FIG. 12 is a diagram showing an example of a scaler process which is performed by the scaler unit 102. In the scaler process, an interpolation pixel (an SC interpolation pixel) is generated with respect to a position where a pixel is not present in the input image ID. In FIG. 12, "P0" denotes a position of interest and "P1" denotes an SC interpolation position (a generation position of an SC interpolation pixel). While the position of interest P0 is not particularly limited, in the present embodiment, as shown in FIG. 12, a center position of four pixels arranged in two rows and two columns in the input image ID is used as a position of interest. The position of interest P0 is a position of interest which is closest to the SC interpolation position P1. The SC interpolation position P1 is dependent on an enlargement rate or a reduction rate of the scaler process. In FIG. 12, "ix_i" denotes an integer value for indicating a horizontal position of a pixel of the input image ID, and "iy_i" denotes an integer value for indicating a vertical position (a position in the vertical direction) of the pixel of the input image ID. In addition, "ix_s" denotes a fractional value for indicating a horizontal position of the SC interpolation position P1, and "iy_s" denotes a fractional value for indicating a vertical position of the SC interpolation position P1. Coordinates (horizontal position, vertical position) of the SC interpolation position P1 can be expressed by (ix_i+ix_s, iy_i+iy_s).

In the present embodiment, in the scaler process, four pixels U1, U2, D1, and D2 of the input image ID are selected based on the angle information ANGLE. In addition, a pixel value DOUT of the SC interpolation position P1 is calculated using pixel values of the four selected pixels U1, U2, D1, and D2. Subsequently, the calculated pixel value DOUT is output as a pixel value of the image OD.

The pixels U1 and U2 are pixels on a line which is one line above the SC interpolation position P1, and the pixels D1 and D2 are pixels on a line which is one line below the SC interpolation position P1. In the present embodiment, the pixels U1 and D1 are selected based on the angle information ANGLE. The pixels U1 and D1 are pixels adjacent to the position of interest P0 in a direction of an edge indicated by the angle information ANGLE. In addition, the pixels U2 and D2 are selected by shifting horizontal positions of the pixels U1 and D1 by one pixel toward the side of the SC interpolation position P1. Horizontal positions $U1(x)$, $U2(x)$, $D1(x)$, and $D2(x)$ of the pixels U1, U2, D1, and D2 can be calculated using Expression 5 below. In Expression 5, "INT(X)" denotes a function for obtaining an integer portion of X.

$$U1(x) = INT(ix\_i + ix\_s + ANGLE \times iy\_s)$$

$$U2(x) = U1(x) + 1$$

$$D1(x)=U1(x)\text{-ANGLE}$$

$$D2(x)=D1(x)+1 \quad \text{(Expression 5)}$$

In FIG. 12, "k" denotes a parameter used in calculating a pixel value of the SC interpolation position P1 and is also a parameter for determining weights of the pixel values of the pixels U1, U2, D1, and D2. As shown in FIG. 12, the parameter k represents a distance between a first position and the pixel U1. The first position is a position on a line which is one line above the SC interpolation position P1 and is also a position adjacent to the SC interpolation position P1 in the direction of the edge indicated by the angle information ANGLE. The parameter k also represents a distance between a second position and the pixel D2. The second position is a position on a line which is one line below the SC interpolation position P1 and is also a position adjacent to the SC interpolation position P1 in the direction of the edge indicated by the angle information ANGLE. The parameter k is calculated using Equation 6 below.

$$k=(ix\_s+\text{ANGLE}\times iy\_s)-\text{INT}(ix\_s+\text{ANGLE}\times iy\_s) \quad \text{(Expression 6)}$$

In addition, a pixel value DOUT of the SC interpolation position P1 is calculated by performing a weighted composition of the pixel values of the pixels U1, U2, D1, and D2 using weights based on the parameter k (weights based on distances from the SC interpolation position P1). Specifically, the pixel value DOUT is calculated using Equation 7 below. In Expression 7, "PD(U1(x), iy_i)" denotes a pixel value of the pixel U1, "PD(U2(x), iy_i)" denotes a pixel value of the pixel U2, "PD(D1(x), iy_i+1)" denotes a pixel value of the pixel D1, and "PD(D2(x), iy_i+1)" denotes a pixel value of the pixel D2.

$$\begin{aligned}\text{DOUT}=&(PD(U1(x), iy\_i)\times(1-k)+PD(U2(x), iy\_i)\times k)\times\\&(1-iy\_s)+(PD(D1(x), iy\_i+1)\times k+PD(D2(x), iy\_i+1)\times(1-k))\times iy\_s\end{aligned} \quad \text{(Expression 7)}$$

According to Expression 7, "1−k" (a distance between the first position and the pixel U2) is used as a weight of a pixel value PD(U1(x), iy_i) and "k" (a distance between the first position and the pixel U1) is used as a weight of a pixel value PD(U2(x), iy_i). Using the weights, a weighted composition of the pixel value PD(U1(x), iy_i) and the pixel value PD(U2(x), iy_i) is performed and a first composite value is calculated.

In addition, "k" (a distance between the second position and the pixel D2) is used as a weight of a pixel value PD(D1(x), iy_i+1) and "1−k" (a distance between the second position and the pixel D1) is used as a weight of a pixel value PD(D2(x), iy_i+1). Using the weights, a weighted composition of the PD(D1(x), iy_i+1) and the pixel value PD(D2(x), iy_i+1) is performed and a second composite value is calculated.

In addition, "1−iy_s" (a vertical distance (a distance in the vertical direction) between the line of the pixels D1 and D2 and the SC interpolation position P1) is used as a weight of the first composite value. Furthermore, "iy_s" (a vertical distance between the line of the pixels U1 and U2 and the SC interpolation position P1) is used as a weight of the second composite value. Using the weights, a weighted composition of the first composite value and the second composite value performed and the pixel value DOUT is calculated.

As described above, according to the present embodiment, at least one of a local maximum point distance and a local minimum point distance is determined and an edge is detected from an input image with a detection sensitivity based on the at least one of a local maximum point distance and a local minimum point distance. Accordingly, an edge can be detected with higher accuracy. For example, a diagonal line with a shallow angle which is close to a horizontal line and which is included in a natural image, a diagonal line included in a periodic pattern, and the like can be detected with high accuracy. As a result, various processes based on a detection result of an edge can be performed with higher accuracy. For example, an occurrence of a jaggy in a scaler process can be suppressed with higher accuracy.

It should be noted that the predetermined direction used by the block matching unit 203 and the extreme point distance determining unit 204 is not limited to the horizontal direction. For example, a diagonal direction may be used as the predetermined direction or the vertical direction may be used as the predetermined direction. An image region which is long in the predetermined direction is favorably used as the detection area. For example, in a case where the predetermined direction is the horizontal direction, the detection area which is long in the horizontal direction is favorably used as shown in FIG. 3. Alternatively, a plurality of directions (for example, the horizontal direction and the vertical direction) may be considered as predetermined directions. In addition, a plurality of processes respectively corresponding to the plurality of directions may be performed and edges may be detected based on results of the plurality of processes.

Second Embodiment

Figure 13:
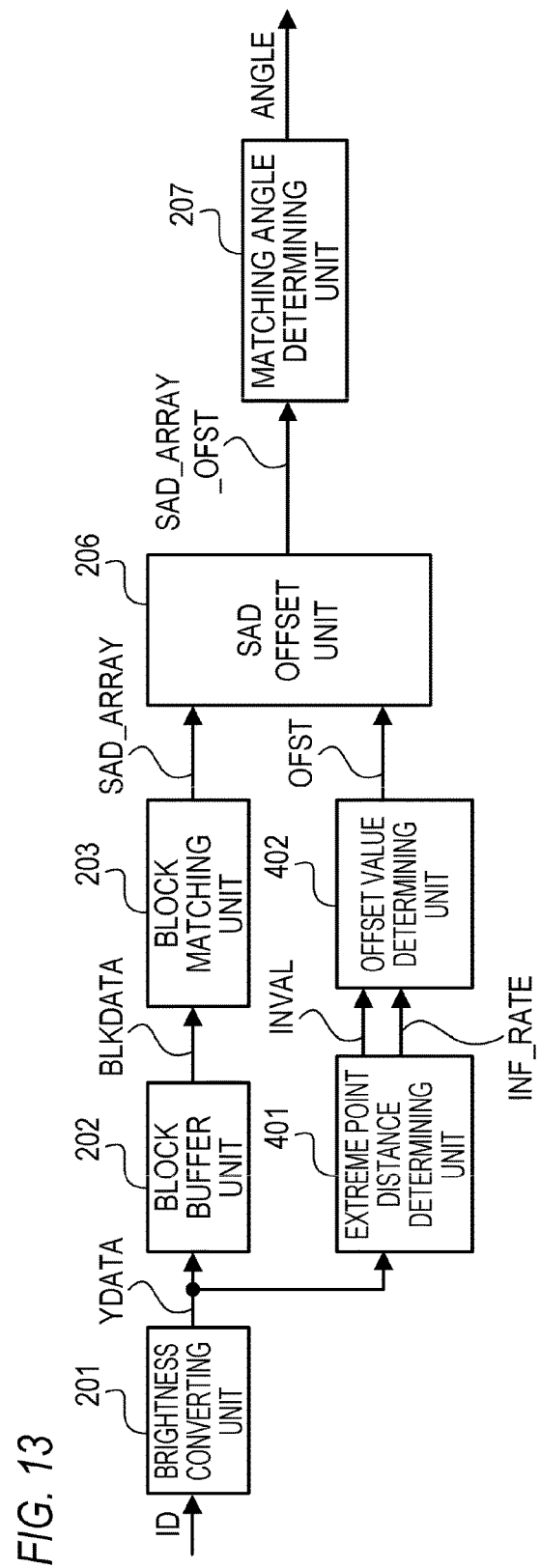
FIG. 13 is a block diagram showing an example of a configuration of an edge detecting unit according to a second embodiment.

A second embodiment of the present invention will be described below. In the first embodiment, an example in which the correspondence relationship between the block distance n and the offset value OFST(n) is solely dependent on the extreme point distance INVAL has been described. In the present embodiment, an example in which the correspondence relationship between the block distance n and the offset value OFST(n) is also dependent on other characteristics (characteristics other than the extreme point distance INVAL) of the input image ID will be described. Hereinafter, configurations and processes that differ from those of the first embodiment will be described in detail and descriptions of configurations and processes that are similar to those of the first embodiment will be omitted. FIG. 13 is a block diagram showing an example of a configuration of an edge detecting unit according to the second embodiment. As shown in FIG. 13, the edge detecting unit according to the present embodiment includes an extreme point distance determining unit 401 in place of the extreme point distance determining unit 204 according to the first embodiment and includes an offset value determining unit 402 in place of the offset value determining unit 205 according to the first embodiment.

The extreme point distance determining unit 401 performs a similar process to the extreme point distance determining unit 204 according to the first embodiment. In addition, the extreme point distance determining unit 401 determines a complexity of the input image ID and outputs a determination result of the complexity to the offset value determining unit 402. In the present embodiment, the complexity of the input image ID in the determination area is determined. It should be noted that an image region which is a determination target of complexity is not limited to the determination area. The complexity of the input image ID in the detection area may be determined or the complexity of the entire input image ID may be determined.

FIG. 14 is a block diagram showing an example of a configuration of the extreme point distance determining unit 401. As shown in FIG. 14, the extreme point distance determining unit 401 includes an extreme point distance calculating unit 403 in place of the extreme point distance calculating unit 303 according to the first embodiment. The extreme point distance calculating unit 403 performs a similar process to the extreme point distance calculating unit 303 according to the first embodiment. In addition, the extreme point distance calculating unit 403 determines a complexity of the input image ID and outputs a determination result of the complexity to the offset value determining unit 402.

In the present embodiment, the extreme point distance calculating unit 403 determines a ratio of a number based on at least one of the number of local maximum pixels and the number of local minimum pixels to the number of pixels of the input image ID as the complexity of the input image ID. Specifically, the extreme point distance calculating unit 403 determines a ratio of a sum of the number of local maximum pixels and the number of local minimum pixels to the number of pixels of the input image ID as the complexity of the input image ID. As described above, in the present embodiment, the extreme point distance calculating unit 403 determines the complexity of the input image ID in the determination area. Therefore, in the present embodiment, a ratio of the sum of the number of local maximum pixels in the determination area and the number of local minimum pixels in the determination area to the number of pixels of the input image ID in the determination area is determined as the complexity of the input image ID in the determination area. Specifically, the extreme point distance calculating unit 403 calculates a complexity (ratio) INF_RATE using Expression 8 below. In Expression 8, "INF_NUM" denotes a sum of the number of local maximum pixels in the determination area and the number of local minimum pixels in the determination area. "BLK_NUM" denotes a total number of pixels in the determination area.

$$\text{INF\_RATE}=\text{INF\_NUM}/\text{BLK\_NUM} \qquad \text{(Expression 8)}$$

In the example shown in FIG. 5, since the total number of pixels BLK_NUM in the determination area is 12 and the number of local maximum pixels=the number of local minimum pixels is 0, the complexity INF_RATE of 0/12=0 is calculated. In the example shown in FIG. 6, since the number of local maximum pixels is 2 and the number of local minimum pixels is 1, the complexity INF_RATE of 3/12=0.25 is calculated.

According to the method described above, the larger the number of local maximum pixels or local minimum pixels, a larger value is calculated as the complexity INF_RATE. For example, in cases of a periodic pattern (in particular, a high frequency periodic pattern with a short repetition period of pictorial patterns (a high repetition frequency of pictorial patterns)), an image in which a plurality of diagonal lines intersect each other, and the like, a high complexity INF_RATE is calculated. FIG. 15 shows an example of a high frequency periodic pattern.

It should be noted that a determination method of complexity is not limited to the method described above. For example, a ratio of the number of local maximum pixels to the number of pixels of the input image ID, a ratio of the number of local minimum pixels to the number of pixels of the input image ID, a ratio of an average of the number of local minimum pixels and the number of local minimum pixels to the number of pixels of the input image ID, or the like may be determined as the complexity of the input image ID. Alternatively, a degree of dispersion of pixel values of the input image ID may be determined as the complexity of the input image ID.

The offset value determining unit 402 performs a similar process to the offset value determining unit 205 according to the first embodiment. However, in the present embodiment, the offset value determining unit 402 sets the second distance (the third range) in accordance with the complexity INF_RATE obtained by the extreme point distance calculating unit 403. Specifically, the offset value determining unit 402 determines (sets) the threshold ATH in accordance with the complexity INF_RATE, and generates the offset table OFS_TBL using the determined threshold ATH. Subsequently, the offset value determining unit 402 determines the offset value OFST(n) in accordance with the generated offset table OFS_TBL.

FIG. 16 shows an example of a correspondence relationship between the complexity INF_RATE and the threshold ATH. In the example shown in FIG. 16, in a case where the complexity INF_RATE is equal to or lower than 0.5, a same value as the extreme point distance INVAL is set as the threshold ATH. In a case where the complexity INF_RATE is higher than 0.5 and equal to or lower than 0.75, a value corresponding to ¾ of the extreme point distance INVAL is set as the threshold ATH. In addition, in a case where the complexity INF_RATE is higher than 0.75, a value corresponding to ½ of the extreme point distance INVAL is set as the threshold ATH. In this manner, in the present embodiment, the higher the complexity INF_RATE, the smaller the value set as the threshold ATH. Therefore, in the present embodiment, the higher the complexity INF_RATE, the shorter the distance set as the second distance and, the higher the complexity INF_RATE, the narrower the range set as the third range. Accordingly, in the present embodiment, the higher the complexity INF_RATE, the steeper a change in the offset value OFST(n)(a change in the offset value OFST (n) relative to a change in the block distance n) in the third range.

Figure 17:
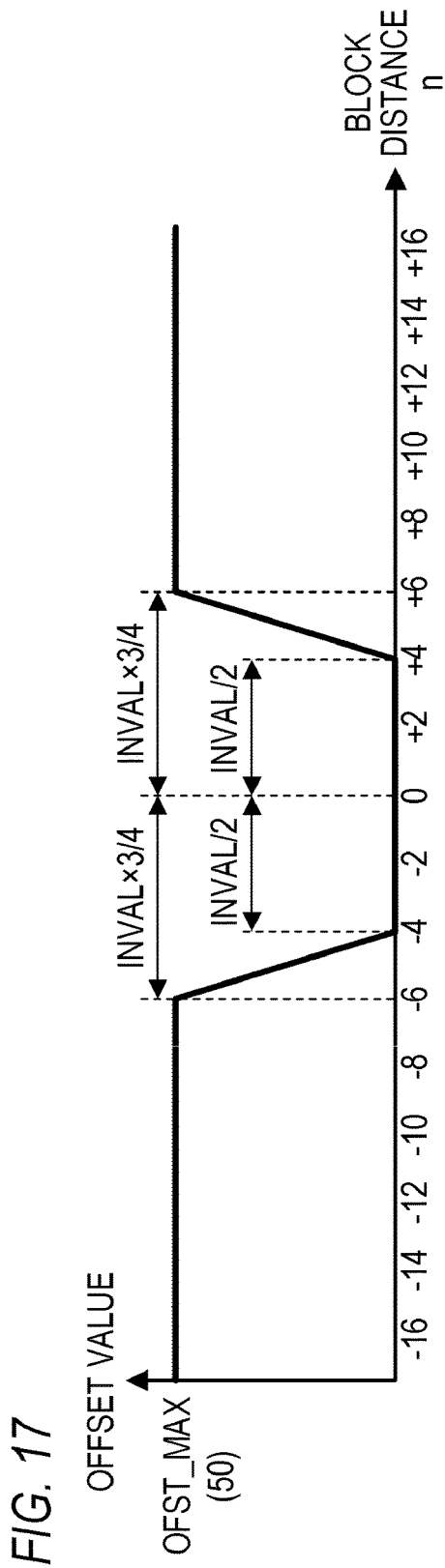
FIG. 17 is a diagram showing an example of an offset table according to the second embodiment.

FIG. 17 is a diagram showing an example of the offset table OFS_TBL corresponding to the extreme point distance INVAL of 8 and the complexity INF_RATE of 0.7. In the example shown in FIG. 17, based on the extreme point distance INVAL of 8 and the complexity INF_RATE of 0.7, the threshold ATH of INVAL×¾=6 is set and a range expressed as −6<n<−4 and a range expressed as +4<n<+6 are set as the third range. In addition, FIG. 17 shows that the third range is narrower and the change in the offset value OFST(n) in the third range is steeper than in FIG. 7.

In image regions with a high frequency periodic pattern or the like, there are a plurality of SAD values SAD_ARRAY (n) which are minimum values and intervals of the SAD values SAD_ARRAY(n) which are minimum values are narrow. In the present embodiment, since a small value is used as the threshold ATH in image regions with a high frequency periodic pattern or the like, a detection sensitivity for an edge is quickly reduced as a distance from the position of interest P0 increases. As a result, in image regions with a high frequency periodic pattern or the like, a false detection of an edge can be suppressed and an edge can be detected with high accuracy. In addition, a large value is used as the threshold ATH in other image regions (an image region including an extremely shallow diagonal line or the like). As a result, even in the other image regions, a false detection of an edge can be suppressed and an edge can be detected with high accuracy.

It should be noted that the process performed by the offset value determining unit 402 is not limited to the process described above. For example, a plurality of offset tables respectively corresponding to a plurality of combinations of the complexity INF_RATE and the extreme point distance INVAL may be prepared in advance. In addition, an offset table corresponding to a combination of the complexity INF_RATE and the extreme point distance INVAL obtained by the extreme point distance calculating unit 403 may be selected and used from the plurality of offset tables.

As described above, according to the present embodiment, the second distance (the third range; the threshold ATH) is set in accordance with a complexity of an input image. Accordingly, a detection sensitivity for an edge can be adjusted more appropriately and an edge can be detected with higher accuracy. While an example in which the threshold ATH changes in three stages in accordance with a change in the complexity of an input image has been presented in the present embodiment, this example is not restrictive. For example, there may be more or less than three possible values of the threshold ATH. The threshold ATH may change continuously in accordance with a change in the complexity of an input image. In addition, while an example in which the threshold ATH is calculated using the extreme point distance INVAL has been presented, this example is not restrictive. For example, the threshold ATH may be set by taking the complexity of an input image into consideration but not taking the extreme point distance INVAL into consideration.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-062159, filed on Mar. 25, 2016, which is hereby incorporated by reference herein in its entirety.

What is claimed is:

1. An edge detecting apparatus, comprising:
at least one processor that operates as:
a first determining unit configured to determine, based on an input image, at least one of a distance between local maximum pixels which are pixels of which gradation values are local maximum values and a distance between local minimum pixels which are pixels of which gradation values are local minimum values; and
a detecting unit configured to detect an edge from the input image with a detection sensitivity based on the distance determined by the first determining unit
wherein the detecting unit:
performs block matching using the input image;
corrects a result of the block matching using a correction parameter corresponding to a detection sensitivity based on a distance determined by the first determining unit; and
detects an edge from the input image based on a result of the block matching after correction.

2. The edge detecting apparatus according to claim 1, wherein
the detecting unit detects any of a plurality of edges respectively corresponding to a plurality of distances from a target position which is a position of a detection target of an edge as an edge at the target position, and
a detection sensitivity for an edge corresponding to a first range of which a distance from the target position is equal to or shorter than a first distance based on the distance determined by the first determining unit is higher than a detection sensitivity for an edge corresponding to a second range of which a distance from the target position is longer than the first distance.

3. The edge detecting apparatus according to claim 2, wherein
the first distance is a distance determined by the first determining unit.

4. The edge detecting apparatus according to claim 2, wherein
the second range includes:
a third range of which a distance from the target position is longer than the first distance and shorter than a second distance; and
a fourth range of which a distance from the target position is equal to or longer than the second distance, and
the detecting unit:
uses a first detection sensitivity as a detection sensitivity for an edge corresponding to the first range;
uses a detection sensitivity which decreases from the first detection sensitivity to a second detection sensitivity as a distance from the target position increases as a detection sensitivity for an edge corresponding to the third range; and
uses the second detection sensitivity as a detection sensitivity for an edge corresponding to the fourth range.

5. The edge detecting apparatus according to claim 4, wherein the processor further operates as:
a second determining unit configured to determine a complexity of the input image; and
a first setting unit configured to set the second distance in accordance with the complexity.

6. The edge detecting apparatus according to claim 5, wherein
the first setting unit sets a shorter distance as the second distance in a case where the complexity is higher.

7. The edge detecting apparatus according to claim 5, wherein the complexity is a ratio of a number based on at least one of the number of the local maximum pixels and the number of the local minimum pixels to the number of pixels of the input image.

8. The edge detecting apparatus according to claim 5, wherein
the complexity is a ratio of a sum of a number of the local maximum pixels and a number of the local minimum pixels to a number of pixels of the input image.

9. The edge detecting apparatus according to claim 5, wherein
the second determining unit determines a complexity of the input image in a determination area based on the target position.

10. The edge detecting apparatus according to claim 9, wherein
the detecting unit detects an edge at the target position using an input image in a detection area based on the target position, and
the processor further operates as:
a second setting unit configured to set a size of the detection area; and
a third setting unit configured to set a size of the determination area in accordance with the size of the detection area.

11. The edge detecting apparatus according to claim 10, wherein
the third setting unit sets a larger size as the size of the determination area in a case where the size of the detection area is larger.

12. The edge detecting apparatus according to claim 1, wherein
each of the local maximum pixel and the local minimum pixel is a pixel in a determination area based on an target position which is a position of a detection target of an edge.

13. The edge detecting apparatus according to claim 1, wherein
in the block matching:
a plurality of combinations of two reference blocks are set; and
for each of the plurality of combinations, a degree of similarity or a degree of dissimilarity between the input image in one reference block corresponding to the combination and the input image in the other reference block corresponding to the combination is determined as a comparison value, and
the correction parameter is an offset value to be added to the comparison value.

14. The edge detecting apparatus according to claim 13, wherein
in the block matching, a plurality of combinations with respectively different positional relationships of the two reference blocks in a predetermined direction are set.

15. The edge detecting apparatus according to claim 1, wherein
the local maximum pixel is a pixel of which a gradation value is a local maximum value in a change in the gradation value in a predetermined direction, and
the local minimum pixel is a pixel of which a gradation value is a local minimum value in a change in the gradation value in the predetermined direction.

16. The edge detecting apparatus according to claim 14, wherein the predetermined direction is a horizontal direction or a vertical direction.

17. The edge detecting apparatus according to claim 1, wherein the processor further operates as:
a fourth setting unit configured to set the detection sensitivity based on a distance determined by the first determining unit.

18. The edge detecting apparatus according to claim 1, wherein
the distance between the local maximum pixels is a distance between two adjacent local maximum pixels, and
the distance between local minimum pixels is a distance between two adjacent local minimum pixels.

19. The edge detecting apparatus according to claim 1, wherein
the first determining unit determines the distance between the local maximum pixels and the distance between the local minimum pixels, and
the detection sensitivity is a detection sensitivity in accordance with a representative distance which is representative of the distance between the local maximum pixels and the distance between the local minimum pixels.

20. The edge detecting apparatus according to claim 19, wherein
the representative distance is the shorter of the distance between the local maximum pixels and the distance between the local minimum pixels.

21. An edge detecting method, comprising:
determining, based on an input image, at least one of a distance between local maximum pixels which are pixels of which gradation values are local maximum values and a distance between local minimum pixels which are pixels of which gradation values are local minimum values; and
detecting an edge from the input image with a detection sensitivity based on the determined distance, wherein in said detecting:
block matching is performed using the input image;
a result of the block matching is corrected using a correction parameter corresponding to a detection sensitivity based on a distance determined in the determining; and
an edge is detected from the input image based on a result of the block matching after correction.

22. A non-transitory computer readable medium that stores a program, wherein the program causes a computer to execute:
determining, based on an input image, at least one of a distance between local maximum pixels which are pixels of which gradation values are local maximum values and a distance between local minimum pixels which are pixels of which gradation values are local minimum values; and
detecting an edge from the input image with a detection sensitivity based on the determined distance, wherein in said detecting:
block matching is performed using the input image;
a result of the block matching is corrected using a correction parameter corresponding to a detection sensitivity based on a distance determined in the determining; and
an edge is detected from the input image based on a result of the block matching after correction.

* * * * *